US012762556B2

(12) United States Patent
Leddy, III

(10) Patent No.: US 12,762,556 B2
(45) Date of Patent: Oct. 13, 2026

(54) SYSTEMS, METHODS, AND COMPUTER PROGRAM PRODUCTS FOR AUTHENTICATING DEVICES

(71) Applicant: Visa International Service Association, San Francisco, CA (US)

(72) Inventor: William Joseph Leddy, III, Lakeway, TX (US)

(73) Assignee: Visa International Service Association, San Francisco, CA (US)

( * ) Notice: Subject to any disclaimer, the term of this patent is extended or adjusted under 35 U.S.C. 154(b) by 144 days.

(21) Appl. No.: 18/026,854

(22) PCT Filed: Nov. 24, 2020

(86) PCT No.: PCT/US2020/061922
§ 371 (c)(1),
(2) Date: Mar. 17, 2023

(87) PCT Pub. No.: WO2022/115098
PCT Pub. Date: Jun. 2, 2022

(65) Prior Publication Data
US 2023/0334491 A1 Oct. 19, 2023

(51) Int. Cl.
*G06Q 20/40* (2012.01)
*G06Q 20/42* (2012.01)

(52) U.S. Cl.
CPC ........... *G06Q 20/401* (2013.01); *G06Q 20/42* (2013.01)

(58) Field of Classification Search
None
See application file for complete search history.

(56) References Cited

U.S. PATENT DOCUMENTS 8,762,283 B2 6/2014 Gerber
9,589,399 B2 3/2017 Taveau et al.
(Continued)

FOREIGN PATENT DOCUMENTS

CN 105516396 A 4/2016
CN 104125063 B 10/2016
(Continued)

OTHER PUBLICATIONS

"Getting Started with Express Checkout—PayPal Developer", The Wayback Machine, 2016, accessed at <https://web/archive.org/web/20160330075234/https://developer.paypal.com/webapps/developer/docs/classic/express-checkout/integration-guide/ECGettingStarted/#id084RN060BPF>, pp. 1-20.
(Continued)

*Primary Examiner* — Chrystina E Zelaskiewicz
(74) *Attorney, Agent, or Firm* — The Webb Law Firm

(57) ABSTRACT

Disclosed are systems and methods for authenticating devices. The method includes generating a virtual authenticator comprising at least one authentication input, at least one account identifier associated with at least one payment account, and at least one device identifier of at least one client device, the virtual authenticator associated with a virtual authenticator identifier, receiving a transaction request message associated with a transaction between a user and a merchant made using an authentication input of the at least one authentication input and a client device of the at least one client device, the transaction request message comprising an account identifier associated with a payment account, linking the account identifier to the virtual authenticator, communicating an authorization request message to the issuer system, the authorization request message comprising the virtual authenticator identifier, receiving an
(Continued)

authorization response message, and updating the virtual authenticator based on the authorization response message.

15 Claims, 7 Drawing Sheets

(56) References Cited

U.S. PATENT DOCUMENTS

| | | | | |
|---|---|---|---|---|
| 9,760,871 | B1 * | 9/2017 | Pourfallah | G06Q 10/10 |
| 9,954,881 | B1 | 4/2018 | Lin et al. | |
| 10,063,547 | B2 | 8/2018 | Zhang et al. | |
| 10,091,195 | B2 | 10/2018 | Lindemann | |
| 10,091,230 | B1 | 10/2018 | Machani et al. | |
| 10,121,129 | B2 | 11/2018 | Kalgi | |
| 11,095,643 | B2 | 8/2021 | Huffman et al. | |
| 11,138,409 | B1 * | 10/2021 | Krueger | G06V 40/1371 |
| 12,277,597 | B2 | 4/2025 | Hu et al. | |
| 2006/0080464 | A1 | 4/2006 | Kozuki | |
| 2007/0291996 | A1 | 12/2007 | Hoffman et al. | |
| 2008/0040261 | A1 | 2/2008 | Nix et al. | |
| 2008/0249938 | A1 | 10/2008 | Drake-Stoker | |
| 2008/0313064 | A1 | 12/2008 | Nelson | |
| 2010/0318460 | A1 | 12/2010 | Stewart et al. | |
| 2011/0179477 | A1 | 7/2011 | Starnes et al. | |
| 2011/0276414 | A1 | 11/2011 | Subbarao et al. | |
| 2012/0233665 | A1 | 9/2012 | Ranganathan et al. | |
| 2013/0308778 | A1 | 11/2013 | Fosmark et al. | |
| 2014/0114857 | A1 | 4/2014 | Griggs et al. | |
| 2015/0052005 | A1 | 2/2015 | Howe | |
| 2015/0120559 | A1 | 4/2015 | Fisher et al. | |
| 2015/0120560 | A1 | 4/2015 | Fisher et al. | |
| 2015/0199689 | A1 * | 7/2015 | Kumnick | G06Q 20/3674 705/67 |
| 2015/0215312 | A1 | 7/2015 | Cesnik | |
| 2015/0294313 | A1 | 10/2015 | Kamal et al. | |
| 2016/0027008 | A1 | 1/2016 | John et al. | |
| 2016/0042341 | A1 | 2/2016 | Griffin et al. | |
| 2016/0057145 | A1 | 2/2016 | Metral | |
| 2016/0203485 | A1 | 7/2016 | Subramanian et al. | |
| 2016/0314460 | A1 | 10/2016 | Subramanian et al. | |
| 2017/0039552 | A1 | 2/2017 | O'Regan et al. | |
| 2017/0230825 | A1 | 8/2017 | Counterman | |
| 2017/0303111 | A1 | 10/2017 | Kohli | |
| 2017/0316415 | A1 | 11/2017 | Gonzalez et al. | |
| 2017/0345009 | A1 | 11/2017 | Unnerstall | |
| 2018/0007052 | A1 | 1/2018 | Quentin | |
| 2018/0026968 | A1 | 1/2018 | Canavor et al. | |
| 2018/0054312 | A1 | 2/2018 | Kamal | |
| 2018/0181955 | A1 * | 6/2018 | Woods | G06Q 20/40145 |
| 2018/0239890 | A1 | 8/2018 | Hefetz | |
| 2018/0268436 | A1 | 9/2018 | Sprague et al. | |
| 2020/0065814 | A1 | 2/2020 | Fang et al. | |
| 2020/0160343 | A1 | 5/2020 | Edwards et al. | |
| 2020/0403992 | A1 * | 12/2020 | Huffman | H04W 12/12 |
| 2025/0021960 | A1 | 1/2025 | Venkatakrishnan et al. | |
| 2025/0124432 | A1 | 4/2025 | John et al. | |

FOREIGN PATENT DOCUMENTS

| | | | |
|---|---|---|---|
| CN | 106952096 | A | 7/2017 |
| CN | 109639719 | B | 1/2020 |

OTHER PUBLICATIONS

"PayPal Website Payments Pro Hosted Solution Integration Guide", 2014, accessed at <https://www.paypalobjects.com/webstatic/en_AU/developer/docs/pdf/hostedsolution_au.pdf>, pp. 1-100.
"Verified by Visa—Merchant Best Practices", 2011, accessed at <https://usa.visa.com/dam/VCOM/download/merchanges/verified-by-visa-merchant-best-practices.pdf>, pp. 1-16.
Azizah et al., "Factors Influencing Continuance Usage of Mobile Wallets in Indonesia", 2018 International Conference on Information Management and Technology, (ICIMTech), pp. 92-97.
Chandra et al., "Bank vs Telecommunication E-Wallet: System Analysis, Purchase, and Payment Method of GO-Mobile CIMB Niaga and T-Cash Telkomsel", 2017 International Conference on Information Management and Technology (ICIMTech), 2017, pp. 165-170.
Mandal et al., "Design of electronic payment system based on authenticated key exchange", Electron Commer Res, 2018, pp. 359-388.
Wandoko et al., "Online trust buildling through third party trust transfer and third party protection", International Conference on Computing and Applied Informatics, 2016, pp. 1-9.
Ahmed et al., "A Novel Algorithm to Prevent Man in the Middle Attack in LAN Environment", SCS, 2010, 7 pages.
Carolina, "Online Credit Card Fraud: An Emerging Crime in the Information Technology", Jurnal InFestasi, Dec. 2012, pp. 219-226, vol. 8, No. 2.
Cision PR Newswire, "LoginID announces Partners integrating its FIDO-certified Strong Customer Authentication platform", Jul. 14, 2020, https://www.prnewswire.com/in/news-releases/loginid-announces-partners-integrating-its-fido-certified-strong-customer-authentication-platform-899034118.html, 5 pages.
Gull et al., "Enterprise Security of Wi-Fi Networks using Simulation", LGU International Journal for Electronic Crime Investigation, Jun. 2018, pp. 15-31, vol. 2, Issue 2.
Iqbal et al., "Attacks on Bluetooth Security Architecture and Its Countermeasures," Springer-Verlag Berlin Heidelberg, 2010, pp. 190-197.
Lee et al., "Detecting Online Game Chargeback Fraud Based on Transaction Sequence Modeling Using Recurrent Neural Network", Springer International Publishing AG, 2018, pp. 297-309.
Li et al., "Predictive Modeling with Delayed Information: a Case Study in E-commerce Transaction Fraud Control", arXiv:1811.06109v1, Nov. 14, 2018, 12 pages.
Mehraj et al., "Contemplation of Effective Security Measures in Access Management from Adoptability Perspective", International Journal of Advanced Computer Science and Applications, 2015, pp. 188-200, vol. 6, No. 8.
Olanrewaju et al., "Security Modeling of Mobile Payment System Architecture", 2013, pp. 1-9.
Parte et al., "Study and Implementation of Multi-Criterion Authentication Approach to Secure Mobile Payment System", IJESAT, 2014, pp. 117-122, vol. 3, Issue 3.
Parusheva, "Card-not-Present Fraud—Challenges and Counteractions", Narodnostopanski arhiv, 2015, pp. 40-56.
Rahman et al., "Security Attacks on Wireless Networks and Their Detection Techniques", Springer Nature Singapore, 2018, pp. 241-270.
Saeed et al., "Fraud Detection in E-Commerce Using Machine Learning", International Journal of Advanced Trends in Computer Science and Engineering, 2021, pp. 2206-2211, vol. 10, No. 3.
Seo et al., "Authenticated Key Agreement Based on NFC for Mobile Payment", International Journal of Computer and Communication Engineering, Jan. 2016, pp. 71-78, vol. 5, No. 1.
Tanaya, "E-Commerce Payment Authentication System with SIM Card", Jurnal Sistem Komputer, 2017, pp. 21-28, vol. 7, No. 1.
Grassi et al., "Digital Identity Guidelines: Federation and Assertions", NIST National Institute of Standards and Technology, 2017, pp. 1-49.
"Express Checkout for Payflow", Paypal, 2013, pp. 1-96, retrieved from <https://www.paypalobjects.com/webstatic/en_US/developer/docs/pdf/pfp_expresscheckout_pp.pdf>.
"Verified by Visa: Acquirer and Merchant Implementation Guide", 2011, pp. 1-114, retrieved from <https://usa.visa.com/dam/VCOM/download/merchants/verified-by-visa-acquirer-merchant-implementation-guide.pdf>.

* cited by examiner

SYSTEMS, METHODS, AND COMPUTER PROGRAM PRODUCTS FOR AUTHENTICATING DEVICES

CROSS-REFERENCE TO RELATED APPLICATION

This application is the United States national phase of International Application No. PCT/US2020/061922 filed Nov. 24, 2020, the entire disclosure of which is hereby incorporated by reference in its entirety.

BACKGROUND

1. Technical Field

The present disclosure relates generally to authenticating devices and, in some non-limiting aspects or embodiments, to systems, methods, and computer program products for generating a virtual authenticator.

2. Technical Considerations

Electronic devices may be used (e.g., smartphones, laptop computers, desktop computers, and/or the like) to conduct a transaction, such as an electronic payment transaction or a login transaction to gain access to a service. For example, an online purchase may include communication between multiple computing devices, such as a device operated by an individual, a device operated by or on behalf of a merchant, and/or a device operated by or on behalf of a transaction service provider. These devices may communicate information such as the identity of an individual purchasing goods and/or services, a quantity and price of the goods and/or services purchased, account information for use in settling the transaction, and/or the like.

However, fraudulent purchases may be made on behalf of the individual by initiating communication between a non-approved individual (e.g., an individual not approved to make purchases on behalf of the individual), the merchant, and/or the transaction service provider. For example, a non-approved individual may intercept information communicated between the device operated by the individual and the devices operated by the merchant and/or the transaction service provider. In such an example, the non-approved individual may then initiate a transaction based on the intercepted information. Such fraud is also possible with non-financial transactions, such as authenticating to access services, data, and/or the like.

SUMMARY

According to non-limiting embodiments or aspects, provided is a computer-implemented method for authenticating devices, comprising: generating, with a transaction processing system comprising at least one processor, a virtual authenticator comprising at least one authentication input, at least one account identifier associated with at least one payment account, and at least one device identifier of at least one client device, the virtual authenticator associated with a virtual authenticator identifier; receiving, with the transaction processing system, a transaction request message associated with a transaction between a user and a merchant made using an authentication input of the at least one authentication input and a client device of the at least one client device, the transaction request message comprising an account identifier associated with a payment account; linking, with the transaction processing system, the account identifier to the virtual authenticator; communicating, with the transaction processing system, an authorization request message to an issuer system, the authorization request message comprising the virtual authenticator identifier; receiving, with the at least one processor of the transaction processing system, an authorization response message; and updating, with the at least one processor of the transaction processing system, the virtual authenticator based on the authorization response message.

In non-limiting embodiments or aspects, the transaction request message further comprises a merchant identifier, and the virtual authenticator further comprises the merchant identifier. In non-limiting embodiments or aspects, the method further comprises: receiving, with at least one processor of the transaction processing system, a plurality of additional transaction requests associated with a plurality of subsequent transactions between the user and the merchant, wherein at least one additional transaction request of the plurality of additional transaction requests comprises a second account identifier and a second authentication input; updating the virtual authenticator based on the second authentication input and a corresponding authorization response message associated with the second authentication input; and linking the second account identifier to the virtual authenticator, the second account identifier is associated with a second virtual authenticator identifier. In non-limiting embodiments or aspects, the method further comprises: associating an authentication identifier with the virtual authenticator, the authentication identifier uniquely identifies the virtual authenticator and is not communicated to the issuer system. In non-limiting embodiments or aspects, the method further comprises: generating, with the issuer system comprising at least one processor, a registration code based on account data associated with the payment account; receiving, with the issuer system, a confirmation message generated by the client device based on the registration code, the least one device identifier, and the at least one authentication input; communicating, with the issuer system, authentication data to the transaction processing system, the authentication data comprising the account identifier, at least one device identifier, and the at least one authentication input; generating, with the at least one processor of a transaction processing system, an authentication graph based on the authentication data; receiving, with the at least one processor of the transaction processing system, a transaction request message associated with a transaction between the user and the merchant, the transaction request message comprising the account identifier; determining, with at least one processor, an authentication result based on the transaction request message and the authentication graph; and updating, with at least one processor, the authentication graph based on the authentication result.

According to non-limiting embodiments or aspects, provided is a system for authenticating devices, the system comprising: at least one processor programmed or configured to: generate a virtual authenticator comprising at least one authentication input, at least one account identifier associated with at least one payment account, and at least one device identifier of at least one client device, the virtual authenticator associated with a virtual authenticator identifier; receive a transaction request message associated with a transaction between a user and a merchant made using an authentication input of the at least one authentication input and a client device of the at least one client device, the transaction request message comprising an account identifier associated with a payment account; link the account identifier to the virtual authenticator; communicate an authorization request message to an issuer system, the authorization request message comprising the virtual authenticator identifier; receive an authorization response message; and update the virtual authenticator based on the authorization response message.

In non-limiting embodiments or aspects, the transaction request message further comprises a merchant identifier, and the virtual authenticator further comprises the merchant identifier. In non-limiting embodiments or aspects, the at least one processor is further programmed or configured to: receive a plurality of additional transaction requests associated with a plurality of subsequent transactions between the user and the merchant, wherein at least one additional transaction request of the plurality of additional transaction requests comprises a second account identifier and a second authentication input; update the virtual authenticator based on the second authentication input and a corresponding authorization response message associated with the second authentication input; and link the second account identifier to the virtual authenticator, the second account identifier is associated with a second virtual authenticator identifier. In non-limiting embodiments or aspects, the at least one processor is further programmed or configured to: associate an authentication identifier with the virtual authenticator, the authentication identifier uniquely identifies the virtual authenticator and is not communicated to the issuer system. In non-limiting embodiments or aspects, further comprising the issuer system configured to: generate a registration code based on account data associated with the payment account; receive a confirmation message generated by the client device based on the registration code, the least one device identifier, and the at least one authentication input; communicate authentication data to a transaction processing system, the authentication data comprising the account identifier, at least one device identifier, and the at least one authentication input, the at least one processor is further programmed or configured to: generate an authentication graph based on the authentication data; receive a transaction request message associated with a transaction between the user and the merchant, the transaction request message comprising the account identifier; determine an authentication result based on the transaction request message and the authentication graph; and update the authentication graph based on the authentication result.

According to non-limiting embodiments or aspects, provided is a computer program product for authenticating devices, the computer program product comprising at least one non-transitory computer-readable medium comprising one or more program instructions that, when executed by at least one processor cause the at least one processor to: generate a virtual authenticator comprising at least one authentication input, at least one account identifier associated with at least one payment account, and at least one device identifier of at least one client device, the virtual authenticator associated with a virtual authenticator identifier; receive a transaction request message associated with a transaction between a user and a merchant made using an authentication input of the at least one authentication input and a client device of the at least one client device, the transaction request message comprising an account identifier associated with a payment account; link the account identifier to the virtual authenticator; communicate an authorization request message to an issuer system, the authorization request message comprising the virtual authenticator identifier; receive an authorization response message; and update the virtual authenticator based on the authorization response message.

In non-limiting embodiments or aspects, the transaction request message further comprises a merchant identifier, and the virtual authenticator further comprises the merchant identifier. In non-limiting embodiments or aspects, the program instructions further cause the at least one processor to: receive a plurality of additional transaction requests associated with a plurality of subsequent transactions between the user and the merchant, wherein at least one additional transaction request of the plurality of additional transaction requests comprises a second account identifier and a second authentication input; update the virtual authenticator based on the second authentication input and a corresponding authorization response message associated with the second authentication input; and link the second account identifier to the virtual authenticator, the second account identifier is associated with a second virtual authenticator identifier. In non-limiting embodiments or aspects, the program instructions further cause the at least one processor to: associate an authentication identifier with the virtual authenticator, the authentication identifier uniquely identifies the virtual authenticator and is not communicated to the issuer system. In non-limiting embodiments or aspects, the program instructions further cause the issuer system in communication with the at least one processor to: generate a registration code based on account data associated with the payment account; receive a confirmation message generated by the client device based on the registration code, the least one device identifier, and the at least one authentication input; communicate authentication data to a transaction processing system, the authentication data comprising the account identifier, at least one device identifier, and the at least one authentication input, the program instructions further cause the at least one processor to: generate an authentication graph based on the authentication data; receive a transaction request message associated with a transaction between the user and the merchant, the transaction request message comprising the account identifier; determine an authentication result based on the transaction request message and the authentication graph; and update the authentication graph based on the authentication result.

According to some non-limiting aspects or embodiments, provided is a computer-implemented method for authenticating devices, the computer-implemented method comprising: receiving, with at least one processor, a request for a device authentication identifier of an account of a user; transmitting, with at least one processor, a device authentication request message via a frame embedded in a webpage of a merchant website, the device authentication request message comprising challenge data associated with a challenge; receiving, with at least one processor, a device authentication response message via the frame embedded in the webpage of the merchant website based on the device authentication request message, the device authentication response message comprising challenge response data associated with a challenge response; transmitting, with at least one processor, a device authentication identifier message comprising the device authentication identifier associated with the account of the user based on the device authentication response message; receiving, with at least one processor, a transaction request message associated with a transaction, comprising: the device authentication identifier, and transaction data associated with the transaction, determining a device score associated with the account of the user based on the device authentication identifier; and generating, with at least one processor, an authorization request message based on the transaction data and the device score.

In some non-limiting aspects or embodiments, the computer-implemented method may comprise transmitting, with at least one processor, the authorization request message to an issuer system; receiving, with at least one processor, an authorization response message from the issuer system, the authorization response message generated in response to receiving the authorization request message; and updating, with at least one processor, the device score based on disposition of the transaction.

According to some non-limiting aspects or embodiments, the computer-implemented method may comprise: receiving, with at least one processor, a public key from a computing device associated with a user to register the computing device with the account associated with the user, the account further associated with the device score; wherein, when registering the computing device with an account associated with the user, the device score is set to a default value associated with a default score.

In some non-limiting aspects or embodiments, the computer-implemented method may comprise: determining, with at least one processor, that a second computing device was previously registered with the account associated with the user, wherein, when registering the computing device with the account associated with the user, the device score is set to a value of an existing device score of the second computing device.

According to some non-limiting aspects or embodiments, the computer-implemented method may comprise: in response to updating the device score, transmitting, with at least one processor, the device score and a transaction response message to a computing device associated with a merchant, wherein updating the device score based on the disposition of the transaction further comprises: determining whether a chargeback occurred or did not occur within a period of time after the transaction was settled; and updating the device score based on determining whether the chargeback occurred or there was no chargeback within the period of time.

In some non-limiting aspects or embodiments, the computer-implemented method may include: receiving, with at least one processor, an authorization response message; determining, with at least one processor, that the transaction is declined based on the authorization response message; and updating, with at least one processor, the device score based on determining that the transaction is declined based on the authorization response message.

According to some non-limiting aspects or embodiments, the computer-implemented method may include: determining, with at least one processor, that a fraudulent transaction is associated with an account associated with the user; and updating, with at least one processor, the device score based on determining the fraudulent transaction is associated with the account associated with the user.

In some non-limiting aspects or embodiments, the computing device associated with the user may be configured to: display, on a display of the computing device associated with the user, a local authentication request in response to receiving the device authentication request message; receive a local authentication response as input at the computing device associated with the user; and transmit a device authentication response based on receiving the local authentication response.

According to some non-limiting aspects or embodiments, a system for authenticating devices may include: at least one processor programmed or configured to: receive a request for a device authentication identifier of an account of a user; transmit a device authentication request message via a frame embedded in a webpage of a merchant website, the device authentication request message comprising challenge data associated with a challenge; receive a device authentication response message via the frame embedded in the webpage of the merchant website based on the device authentication request message, the device authentication response message comprising challenge response data associated with a challenge response; transmit a device authentication identifier message comprising the device authentication identifier associated with the account of the user based on the device authentication response message; receive a transaction request message associated with a transaction, comprising: the device authentication identifier, and transaction data associated with the transaction, determine a device score associated with the account of the user based on the device authentication identifier; and generate an authorization request message including the transaction data and the device score.

In some non-limiting aspects or embodiments the at least one processor of the system may be programmed or configured to: transmit the authorization request message to an issuer system; receive an authorization response message from the issuer system, the authorization response message generated in response to receiving the authorization request message; and update the device score based on disposition of the transaction.

According to some non-limiting aspects or embodiments, the at least one processor of the system may be programmed or configured to: receive a public key from a computing device associated with a user to register the computing device with the account associated with the user, the account further associated with the device score; wherein, when registering the computing device with an account associated the user, the at least one processor is programmed or configured to set the device score to a default value associated with a default score.

In some non-limiting aspects or embodiments, the at least one processor of the system may be programmed or configured to: determine that a second computing device was previously registered with the account associated with the user, wherein, when registering the computing device with the account associated with the user, the at least one processor is programmed or configured to set the device score to a value of an existing device score of the second computing device.

According to some non-limiting aspects or embodiments, the at least one processor of the system may be programmed or configured to: in response to updating the device score, transmit the device score and a transaction response message to a computing device associated with a merchant, wherein when updating the device score based on the disposition of the transaction, the at least one processor is programmed or configured to: determine whether a chargeback occurred or did not occur within a period of time after the transaction was settled; and update the device score based on determining whether the chargeback occurred or there was no chargeback within the period of time.

In some non-limiting aspects or embodiments, the at least one processor of the system may be programmed or configured to: receive an authorization response message; determine that the transaction is declined based on the authorization response message; and update the device score based on determining that the transaction is declined based on the authorization response message.

According to some non-limiting aspects or embodiments, the at least one processor of the system may be programmed or configured to: determine that a fraudulent transaction is associated with an account associated with the user; and update the device score based on determining the fraudulent transaction is associated with the account associated with the user.

In some non-limiting aspects or embodiments, the system may include a computing device associated with the user, the computing device including at least one processor that may be programmed or configured to: display, on a display of the computing device associated with the user, a local authentication request in response to receiving the device authentication request message; receive a local authentication response as input at the computing device associated with the user; and transmit a device authentication response based on receiving the local authentication response.

According to some non-limiting aspects or embodiments, a computer program product for authenticating devices may include at least one non-transitory computer-readable medium, the non-transitory computer-readable medium including one or more instructions that, when executed by at least one processor cause the at least one processor to: receive a request for a device authentication identifier of an account of a user; transmit a device authentication request message via a frame embedded in a webpage of a merchant website, the device authentication request message comprising challenge data associated with a challenge; receive a device authentication response message via the frame embedded in the webpage of the merchant website based on the device authentication request message, the device authentication response message comprising challenge response data associated with a challenge response; transmit a device authentication identifier message comprising the device authentication identifier associated with the account of the user based on the device authentication response message; receive a transaction request message associated with a transaction, including: the device authentication identifier, and transaction data associated with the transaction, determine a device score associated with the account of the user based on the device authentication identifier; and generate an authorization request message based on the transaction data and the device score.

In some non-limiting aspects or embodiments, the computer program product may include one or more instructions that may cause the at least one processor to: transmit the authorization request message to an issuer system; receive an authorization response message from the issuer system, the authorization response message generated in response to receiving the authorization request message; and update the device score based on disposition of the transaction.

According to some non-limiting aspects or embodiments, the computer program product may include one or more instructions that cause the at least one processor to: receive a public key from a computing device associated with a user to register the computing device with the account associated with the user, the account further associated with the device score; wherein the one or more instructions that cause the at least one processor to register the computing device with an account associated with the user cause the at least one processor to set the device score to a default value associated with a default score.

In some non-limiting aspects or embodiments, the computer program product may include the one or more instructions that cause the at least one processor to: determine that a second computing device was previously registered with the account associated with the user, wherein the one or more instructions that cause the at least one processor to register the computing device with the account associated with the user cause the at least one processor to set the device score to a value of an existing device score of the second computing device.

According to some non-limiting aspects or embodiments, the computer program product may include the one or more instructions that cause the at least one processor to: in response to updating the device score, transmit the device score and a transaction response message to a computing device associated with a merchant, wherein the instructions that cause the at least one processor to update the device score based on the disposition of the transaction, cause the at least one processor to: determine whether a chargeback occurred or did not occur within a period of time after the transaction was settled; and update the device score based on determining whether the chargeback occurred or there was no chargeback within the period of time.

In some non-limiting aspects or embodiments, the computer program product may include one or more instructions that cause the at least one processor to: receive an authorization response message; determine that the transaction is declined based on the authorization response message; and update the device score based on determining that the transaction is declined based on the authorization response message.

According to some non-limiting aspects or embodiments, the computer program product may include one or more instructions that cause the at least one processor to: determine that a fraudulent transaction is associated with an account associated with the user; and update the device score based on determining the fraudulent transaction is associated with the account associated with the user.

In some non-limiting aspects or embodiments, the computer program product may include one or more instructions that cause the at least one processor to cause a computing device associated with the user to: display, on a display of the computing device associated with the user, a local authentication request in response to receiving the device authentication request message; receive a local authentication response as input at the computing device associated with the user; and transmit a device authentication response based on receiving the local authentication response.

According to another embodiment, provided is a computer-implemented method for authenticating devices, the computer-implemented method comprising: receiving, with at least one processor, a request for a device authentication identifier for an account of a user; transmitting, with at least one processor, a device authentication request message via a pop-up browser window instantiated from code in a webpage of a merchant website, wherein the pop-up browser window includes webpage data from a domain separate from a domain that provides the merchant website, the device authentication request message comprising challenge data associated with a challenge; receiving, with at least one processor, a device authentication response message via the pop-up window based on the device authentication request message, the device authentication response message comprising challenge response data associated with a challenge response; transmitting, with at least one processor, a device authentication identifier message comprising the device authentication identifier associated with the account of the user based on the device authentication response message; receiving, with at least one processor, a transaction request message associated with a transaction, comprising: the device authentication identifier, and transaction data associated with the transaction, determining a device score associated with the account of the user based on the device authentication identifier; and generating, with at least one processor, an authorization request message based on the transaction data and the device score.

Further non-limiting embodiments or aspects are set forth in the following numbered clauses:

Clause 1: A computer-implemented method for authenticating devices, comprising: generating, with a transaction processing system comprising at least one processor, a virtual authenticator comprising at least one authentication input, at least one account identifier associated with at least one payment account, and at least one device identifier of at least one client device, the virtual authenticator associated with a virtual authenticator identifier; receiving, with the transaction processing system, a transaction request message associated with a transaction between a user and a merchant made using an authentication input of the at least one authentication input and a client device of the at least one client device, the transaction request message comprising an account identifier associated with a payment account; linking, with the transaction processing system, the account identifier to the virtual authenticator; communicating, with the transaction processing system, an authorization request message to an issuer system, the authorization request message comprising the virtual authenticator identifier; receiving, with the at least one processor of the transaction processing system, an authorization response message; and updating, with the at least one processor of the transaction processing system, the virtual authenticator based on the authorization response message.

Clause 2: The computer-implemented method of clause 1, wherein the transaction request message further comprises a merchant identifier, and wherein the virtual authenticator further comprises the merchant identifier.

Clause 3: The computer-implemented method of clauses 1 or 2, further comprising: receiving, with at least one processor of the transaction processing system, a plurality of additional transaction requests associated with a plurality of subsequent transactions between the user and the merchant, wherein at least one additional transaction request of the plurality of additional transaction requests comprises a second account identifier and a second authentication input; updating the virtual authenticator based on the second authentication input and a corresponding authorization response message associated with the second authentication input; and linking the second account identifier to the virtual authenticator, wherein the second account identifier is associated with a second virtual authenticator identifier.

Clause 4: The computer-implemented method of any of clauses 1-3, further comprising: associating an authentication identifier with the virtual authenticator, wherein the authentication identifier uniquely identifies the virtual authenticator and is not communicated to the issuer system.

Clause 5: The computer-implemented method of any of clauses 1-4, further comprising: generating, with the issuer system comprising at least one processor, a registration code based on account data associated with the payment account; receiving, with the issuer system, a confirmation message generated by the client device based on the registration code, the least one device identifier, and the at least one authentication input; communicating, with the issuer system, authentication data to the transaction processing system, the authentication data comprising the account identifier, at least one device identifier, and the at least one authentication input; generating, with the at least one processor of a transaction processing system, an authentication graph based on the authentication data; receiving, with the at least one processor of the transaction processing system, a transaction request message associated with a transaction between the user and the merchant, the transaction request message comprising the account identifier; determining, with at least one processor, an authentication result based on the transaction request message and the authentication graph; and updating, with at least one processor, the authentication graph based on the authentication result.

Clause 6: A system for authenticating devices, the system comprising: at least one processor programmed or configured to: generate a virtual authenticator comprising at least one authentication input, at least one account identifier associated with at least one payment account, and at least one device identifier of at least one client device, the virtual authenticator associated with a virtual authenticator identifier; receive a transaction request message associated with a transaction between a user and a merchant made using an authentication input of the at least one authentication input and a client device of the at least one client device, the transaction request message comprising an account identifier associated with a payment account; link the account identifier to the virtual authenticator; communicate an authorization request message to an issuer system, the authorization request message comprising the virtual authenticator identifier; receive an authorization response message; and update the virtual authenticator based on the authorization response message.

Clause 7: The system of clause 6, wherein the transaction request message further comprises a merchant identifier, and wherein the virtual authenticator further comprises the merchant identifier.

Clause 8: The system of clauses 6 or 7, wherein the at least one processor is further programmed or configured to: receive a plurality of additional transaction requests associated with a plurality of subsequent transactions between the user and the merchant, wherein at least one additional transaction request of the plurality of additional transaction requests comprises a second account identifier and a second authentication input; update the virtual authenticator based on the second authentication input and a corresponding authorization response message associated with the second authentication input; and link the second account identifier to the virtual authenticator, wherein the second account identifier is associated with a second virtual authenticator identifier.

Clause 9: The system of any of clauses 6-8, wherein the at least one processor is further programmed or configured to: associate an authentication identifier with the virtual authenticator, wherein the authentication identifier uniquely identifies the virtual authenticator and is not communicated to the issuer system.

Clause 10: The system of any of clauses 6-9, further comprising the issuer system configured to: generate a registration code based on account data associated with the payment account; receive a confirmation message generated by the client device based on the registration code, the least one device identifier, and the at least one authentication input; communicate authentication data to a transaction processing system, the authentication data comprising the account identifier, at least one device identifier, and the at least one authentication input, wherein the at least one processor is further programmed or configured to: generate an authentication graph based on the authentication data; receive a transaction request message associated with a transaction between the user and the merchant, the transaction request message comprising the account identifier; determine an authentication result based on the transaction request message and the authentication graph; and update the authentication graph based on the authentication result.

Clause 11: A computer program product for authenticating devices, the computer program product comprising at least one non-transitory computer-readable medium comprising one or more program instructions that, when executed by at least one processor cause the at least one processor to: generate a virtual authenticator comprising at least one authentication input, at least one account identifier associated with at least one payment account, and at least one device identifier of at least one client device, the virtual authenticator associated with a virtual authenticator identifier; receive a transaction request message associated with a transaction between a user and a merchant made using an authentication input of the at least one authentication input and a client device of the at least one client device, the transaction request message comprising an account identifier associated with a payment account; link the account identifier to the virtual authenticator; communicate an authorization request message to an issuer system, the authorization request message comprising the virtual authenticator identifier; receive an authorization response message; and update the virtual authenticator based on the authorization response message.

Clause 12: The computer program product of clause 11, wherein the transaction request message further comprises a merchant identifier, and wherein the virtual authenticator further comprises the merchant identifier.

Clause 13: The computer program product of clauses 11 or 12, wherein the program instructions further cause the at least one processor to: receive a plurality of additional transaction requests associated with a plurality of subsequent transactions between the user and the merchant, wherein at least one additional transaction request of the plurality of additional transaction requests comprises a second account identifier and a second authentication input; update the virtual authenticator based on the second authentication input and a corresponding authorization response message associated with the second authentication input; and link the second account identifier to the virtual authenticator, wherein the second account identifier is associated with a second virtual authenticator identifier.

Clause 14: The computer program product of any of clauses 11-13, wherein the program instructions further cause the at least one processor to: associate an authentication identifier with the virtual authenticator, wherein the authentication identifier uniquely identifies the virtual authenticator and is not communicated to the issuer system.

Clause 15: The computer program product of any of clauses 11-14, wherein the program instructions further cause the issuer system in communication with the at least one processor to: generate a registration code based on account data associated with the payment account; receive a confirmation message generated by the client device based on the registration code, the least one device identifier, and the at least one authentication input; communicate authentication data to a transaction processing system, the authentication data comprising the account identifier, at least one device identifier, and the at least one authentication input, wherein the program instructions further cause the at least one processor to: generate an authentication graph based on the authentication data; receive a transaction request message associated with a transaction between the user and the merchant, the transaction request message comprising the account identifier; determine an authentication result based on the transaction request message and the authentication graph; and update the authentication graph based on the authentication result.

Clause 16: A computer-implemented method for authenticating devices, the computer-implemented method comprising: receiving, with at least one processor, a request for a device authentication identifier of an account of a user; transmitting, with at least one processor, a device authentication identifier request message via a frame embedded in a webpage of a merchant website, the device authentication identifier request message comprising challenge data associated with a challenge; receiving, with at least one processor, a device authentication response message via the frame embedded in the webpage of the merchant website based on the device authentication request message, the device authentication response message comprising challenge response data associated with a challenge response; transmitting, with at least one processor, a device authentication identifier message comprising the device authentication identifier associated with the account of the user based on the device authentication response message; receiving, with at least one processor, a transaction request message associated with a transaction, comprising: the device authentication identifier, and transaction data associated with the transaction, determining that a device score associated with the account of the user corresponds to the device authentication identifier; and generating, with at least one processor, an authorization request message based on the transaction data and the device score.

Clause 17: The computer-implemented method according to clause 16, further comprising: transmitting, with at least one processor, the authorization request message to an issuer system; receiving, with at least one processor, an authorization response message from the issuer system, the authorization response message generated in response to receiving the authorization request message; and updating, with at least one processor, the device score based on disposition of the transaction.

Clause 18: The computer-implemented method according to clauses 16 or 17, further comprising: receiving, with at least one processor, a public key from a computing device associated with a user to register the computing device with the account associated with the user, the account further associated with the device score; wherein, when registering the computing device with an account associated with the user, the device score is set to a default value associated with a default score.

Clause 19: The computer-implemented method according to any of clauses 16-18, further comprising: determining, with at least one processor, that a second computing device was previously registered with the account associated with the user, transmitting, with at least one processor, a new device registration message to the second computing device including a prompt to verify that the computing device is permitted to be registered; receiving, with at least one processor a registration response message including an indication as to whether the computing device is permitted to be registered in association with the second computing device; and determining, with at least one processor, that the computing device is permitted to be registered based on the indication included in the registration response message, wherein, when registering the computing device with the account associated with the user, the device score is set to a value based on a value of an existing device score of the second computing device after determining that the computing device is permitted to be registered in association with the second computing device.

Clause 20: The computer-implemented method according to any of clauses 16-19, further comprising: in response to updating the device score, transmitting, with at least one processor, the device score data associated with the device score and a transaction response message to a computing device associated with a merchant, wherein updating the device score based on the disposition of the transaction further comprises: determining whether a chargeback occurred or did not occur within a period of time after the transaction was settled; and updating the device score based on determining whether the chargeback occurred or there was no chargeback within the period of time.

Clause 21: The computer-implemented method according to any of clauses 16-20, further comprising: receiving, with at least one processor an authorization response message; determining, with at least one processor, that the transaction is not approved based on the authorization response message; and updating, with at least one processor, the device score based on determining that the transaction is declined based on the authorization response message.

Clause 22: The computer-implemented method according to any of clauses 16-21, further comprising: determining, with at least one processor, that a fraudulent transaction is associated with an authentication application; and updating, with at least one processor, the device score based on determining the fraudulent transaction is associated with the authentication application.

Clause 23: The computer-implemented method according to any of clauses 16-22, wherein the computing device associated with the user is configured to: display, on a display of the computing device associated with the user, a local authentication request in response to receiving the device authentication request message; receive a local authentication response as input at the computing device associated with the user; and transmit a device authentication response based on receiving the local authentication response.

Clause 24: A system for authenticating devices, the system comprising: at least one processor programmed or configured to: receive a request for a device authentication identifier of an account of a user; transmit a device authentication request message via a frame embedded in a webpage of a merchant website, the device authentication request message comprising challenge data associated with a challenge; receive a device authentication response message via the frame embedded in the webpage of the merchant website based on the device authentication request message, the device authentication response message comprising challenge response data associated with a challenge response; transmit a device authentication identifier message comprising the device authentication identifier associated with the account of the user based on the device authentication response message; receive a transaction request message associated with a transaction, comprising: the device authentication identifier, and transaction data associated with the transaction, determine a device score associated with the account of the user based on the device authentication identifier; and generate an authorization request message based on the transaction data and the device score.

Clause 25: The system according to clause 24, wherein the at least one processor is programmed or configured to: transmit the authorization request message to an issuer system; receive an authorization response message from the issuer system, the authorization response message generated in response to receiving the authorization request message; and update the device score based on disposition of the transaction.

Clause 26: The system according to clauses 24 or 25, wherein the at least one processor is programmed or configured to: receive a public key from a computing device associated with a user to register the computing device with the account associated with the user, the account further associated with the device score; wherein, when registering the computing device with an account associated with the user, the at least one processor is programmed or configured to set the device score to a default value associated with a default score.

Clause 27: The system according to any of clauses 24-26, wherein the at least one processor is programmed or configured to: determine that a second computing device was previously registered with the account associated with the user, wherein, when registering the computing device with the account associated with the user, the at least one processor is programmed or configured to set the device score to a value based on an existing device score of the second computing device.

Clause 28: The system according to any of clauses 24-27, wherein the at least one processor is programmed or configured to: in response to updating the device score, transmit the device score and a transaction response message to a computing device associated with a merchant, wherein when updating the device score based on the disposition of the transaction, the at least one processor is programmed or configured to: determine whether a chargeback occurred or did not occur within a period of time after the transaction was settled; and update the device score based on determining whether the chargeback occurred or there was no chargeback within the period of time.

Clause 29: The system according to any of clauses 24-28, wherein the at least one processor is programmed or configured to: receive an authorization response message; determine that the transaction is declined or approved based on the authorization response message; and update the device score based on determining that the transaction is declined or approved based on the authorization response message.

Clause 30: The system according to any of clauses 24-29, wherein the at least one processor is programmed or configured to: determine that a fraudulent transaction is associated with a device associated with the user; and update the device score based on determining the fraudulent transaction is associated with the device associated with the user.

Clause 31: The system according to any of clauses 24-30, wherein a computing device associated with the user comprises at least one processor programmed or configured to: display, on a display of the computing device associated with the user, a local authentication request in response to receiving the device authentication request message; receive a local authentication response as input at the computing device associated with the user; and transmit a device authentication response based on receiving the local authentication response.

Clause 31: A computer program product for authenticating devices, the computer program product comprising at least one non-transitory computer-readable medium comprising one or more instructions that, when executed by at least one processor cause the at least one processor to: receive a request for a device authentication identifier of an account of a user; transmit a device authentication request message via a frame embedded in a webpage of a merchant website, the device authentication request message comprising challenge data associated with a challenge; receive a device authentication response message via the frame embedded in the webpage of the merchant website based on the device authentication request message, the device authentication response message comprising challenge response data associated with a challenge response; transmit a device authentication identifier message comprising the device authentication identifier associated with the account of the user based on the device authentication response message; receive a transaction request message associated with a transaction, comprising: the device authentication identifier, and transaction data associated with the transaction, determine a device score associated with the device authentication identifier; and generate an authorization request message based on the transaction data and the device score.

Clause 32: The computer program product according to clause 31, wherein the one or more instructions further cause the at least one processor to: transmit the authorization request message to an issuer system; receive an authorization response message from the issuer system, the authorization response message generated in response to receiving the authorization request message; and update the device score based on disposition of the transaction.

Clause 33: The computer program product according to clauses 31 or 32, wherein the one or more instructions further cause the at least one processor to: receive a public key from a computing device associated with a user to register the computing device with the account associated with the user, the account further associated with the device score; wherein, when registering the computing device with an account associated with the user, the at least one processor is programmed or configured to set the device score to a default value associated with a default score.

Clause 34: The computer program product according to any of clauses 31-33, wherein the one or more instructions further cause the at least one processor to: determine that a second computing device was previously registered with the account associated with the user, wherein, when registering the computing device with the account associated with the user, the at least one processor is programmed or configured to set the device score to a value of an existing device score of the second computing device.

Clause 35: The computer program product according to any of clauses 31-34, wherein the one or more instructions further cause the at least one processor to: in response to updating the device score, transmit the device score and a transaction response message to a computing device associated with a merchant, wherein when updating the device score based on the disposition of the transaction, the at least one processor is programmed or configured to: determine whether a chargeback occurred or did not occur within a period of time after the transaction was settled; and update the device score based on determining whether the chargeback occurred or did not occur within the period of time.

Clause 36: The computer program product according to any of clauses 31-35, wherein the one or more instructions further cause the at least one processor to: receive an authorization response message; determine that the transaction is declined or accepted based on the authorization response message; and update the device score based on determining that the transaction is declined or accepted based on the authorization response message.

Clause 37: The computer program product according to any of clauses 31-36, wherein the one or more instructions further cause the at least one processor to: determine that a fraudulent transaction is associated with an account associated with the user; and update the device score based on determining the fraudulent transaction is associated with the account associated with the user.

Clause 38: The computer program product according to any of clauses 31-37, wherein the one or more instructions further cause the at least one processor to cause a computing device associated with the user to: display, on a display of the computing device associated with the user, a local authentication request in response to receiving the device authentication request message; receive a local authentication response as input at the computing device associated with the user; and transmit a device authentication response based on receiving the local authentication response.

Clause 39: A computer-implemented method for authenticating devices, the computer-implemented method comprising: receiving, with at least one processor, a request for a device authentication identifier for an account of a user; transmitting, with at least one processor, a device authentication request message via a pop-up browser window instantiated from code in a webpage of a merchant website, wherein the pop-up browser window includes webpage data from a domain separate from a domain that provides the merchant website, the device authentication request message comprising challenge data associated with a challenge; receiving, with at least one processor, a device authentication response message via the pop-up window based on the device authentication request message, the device authentication response message comprising challenge response data associated with a challenge response; transmitting, with at least one processor, a device authentication identifier message comprising the device authentication identifier associated with the account of the user based on the device authentication response message; receiving, with at least one processor, a transaction request message associated with a transaction, comprising: the device authentication identifier, and transaction data associated with the transaction, determining a device score associated with the account of the user based on the device authentication identifier; and generating, with at least one processor, an authorization request message based on the transaction data and the device score.

These and other features and characteristics of the presently disclosed subject matter, as well as the methods of operation and functions of the related elements of structures and the combination of parts and economies of manufacture, will become more apparent based on the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

DETAILED DESCRIPTION

Figure 1:
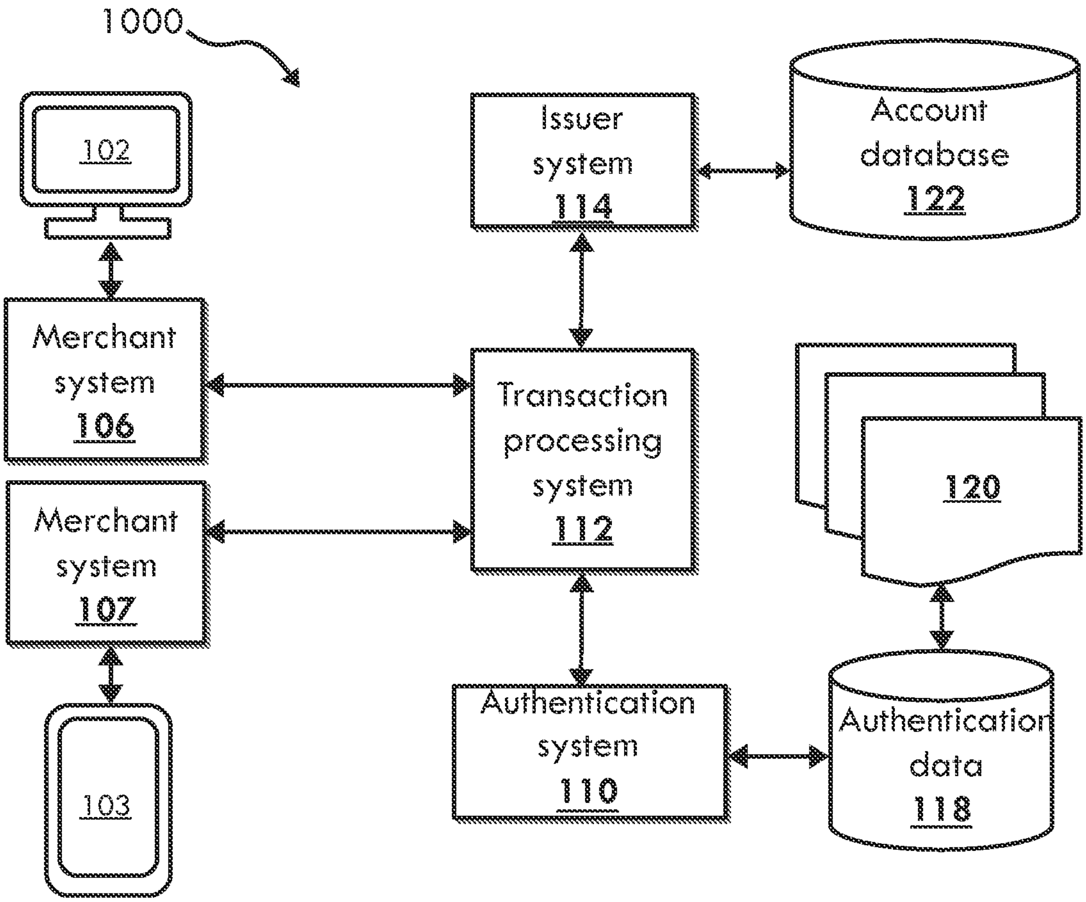
FIG. 1 is a schematic diagram of a system for authenticating devices according to non-limiting aspects or embodiments.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "account identifier" may refer to one or more types of identifiers associated with an account (e.g., a (primary account number (PAN)) associated with an account, a card number associated with an account, a payment card number associated with an account, a token associated with an account, and/or the like). In some non-limiting embodiments, an issuer may provide an account identifier (e.g., a PAN, a token, and/or the like) to a user (e.g., an accountholder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments, the account identifier may be an original account identifier, where the original account identifier was provided to a user at the creation of the account associated with the account identifier. In some non-limiting embodiments, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that is linked to a PAN or other type of account identifier. Account identifiers may be alphanumeric, any combination of characters and/or symbols, and/or the like.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions that the acquirer may originate may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments, an acquirer may be a financial institution, such as a bank.

As used herein, the terms "communication" and "communicate" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments, a message may refer to a network packet (e.g., a data packet and/or the like) that includes data.

As used herein, the term "computing device" may refer to one or more electronic devices that are configured to directly or indirectly communicate with or over one or more networks. A computing device may be a mobile or portable computing device, a desktop computer, a server, and/or the like. Furthermore, the term "computer" may refer to any computing device that includes the necessary components to receive, process, and output data, and normally includes a display, a processor, a memory, an input device, and a network interface. A "computing system" may include one or more computing devices or computers. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.). Further, multiple computers, e.g., servers, or other computerized devices directly or indirectly communicating in the network environment may constitute a "system" or a "computing system."

As used herein, the terms "client" and "client device" may refer to one or more computing devices, such as processors, storage devices, and/or similar computer components, that access a service made available by a server. In some non-limiting embodiments, a "client device" may refer to one or more devices that facilitate payment transactions, such as point-of-sale (POS) devices and/or POS systems used by a merchant. In some non-limiting embodiments, a client device may include an electronic device configured to communicate with one or more networks and/or facilitate payment transactions such as, but not limited to, one or more desktop computers, one or more portable computers (e.g., tablet computers), one or more mobile devices (e.g., cellular phones, smartphones, PDAs, wearable devices, such as watches, glasses, lenses, and/or clothing, and/or the like), and/or other like devices. Moreover, a "client" may also refer to an entity, such as a merchant, that owns, utilizes, and/or operates a client device for facilitating payment transactions with a transaction service provider.

As used herein, the terms "electronic wallet," "electronic wallet mobile application," and "digital wallet" may refer to one or more electronic devices including one or more software applications configured to facilitate and/or conduct transactions (e.g., payment transactions, electronic payment transactions, and/or the like). For example, an electronic wallet may include a user device (e.g., a mobile device) executing an application program, server-side software, and/or databases for maintaining and providing data to be used during a payment transaction to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a (PAN), to a customer that uniquely identifies one or more accounts associated with that customer. In some non-limiting embodiments, an issuer may be associated with a bank identification number (BIN) that uniquely identifies the issuer institution. As used herein "issuer system" may refer to one or more computer systems operated by or on behalf of an issuer, such as a server executing one or more software applications. For example, an issuer system may include one or more authorization servers for authorizing a transaction.

As used herein, the term "payment device" may refer to an electronic payment device, a portable financial device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, a "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like. As used herein, a "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments, a POS system (e.g., a merchant POS system) may include one or more server computers programmed or configured to process online payment transactions through webpages, mobile applications, and/or the like.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein "merchant system" may refer to one or more computer systems operated by or on behalf of a merchant, such as a server executing one or more software applications. As used herein, the term "product" may refer to one or more goods and/or services offered by a merchant.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction processing system" may refer to an entity that receives transaction authorization requests from merchants or other entities and provides guarantees of payment, in some cases through an agreement between the transaction service provider and an issuer institution. For example, a transaction processing system may include a payment network such as Visa®, MasterCard®, American Express®, or any other entity that processes transactions. As used herein "transaction service provider system" or "transaction processing system" may refer to one or more computer systems operated by or on behalf of a transaction service provider, such as a transaction processing system executing one or more software applications. A transaction processing system may include one or more processors and, in some non-limiting embodiments, may be operated by or on behalf of a transaction service provider.

As used herein, the term "token" may refer to an account identifier that is used as a substitute or replacement for another account identifier, such as a PAN. Tokens may be associated with a PAN or other original account identifier in one or more data structures (e.g., one or more databases and/or the like) such that they may be used to conduct a payment transaction without directly using the original account identifier. In some non-limiting embodiments, an original account identifier, such as a PAN, may be associated with a plurality of tokens for different individuals or purposes. In some non-limiting embodiments, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

Provided are improved systems, methods, and computer program products for authenticating a device and transferring authentication-based trust to multiple devices. For example, once a transaction is initiated with a user device at a merchant, the user device may be authenticated as being the actual device being communicated with (e.g., a device may be given a challenge to respond to that, when answered correctly, indicates the device is the authentic user device). A transaction processing system and/or payment gateway, acting as a central system that interacts separately with multiple issuer systems, generates virtual authenticators to permit widespread authentication of user devices among multiple merchants, with multiple authentication methods, and using multiple different accounts. This functionality provides issuer institutions and other entities with more authentication security and flexibility, as the transaction processing system is enabled to build a robust set of virtual authenticators that is usable with multiple other entities. User privacy can be preserved because each of the multiple entities (e.g., issuer systems, healthcare providers, and/or other entities interacting with a user) is provided a unique identifier mapping to the authenticator so they will not be able to collude with other entities to share information about the user.

Referring now to FIG. 1, illustrated is a diagram of a system 1000 for authenticating devices according to non-limiting embodiments. As illustrated in FIG. 1, the system 1000 comprises user devices 102, 103, merchant systems 106, 107, a transaction processing system 112, an issuer system 114, and an authentication system 110. The merchant systems 106, 107 may include POS devices, web servers, and/or the like, capable of initiating a payment transaction with the transaction processing system 112. In some examples, the merchant systems 106, 107 may be in communication with the transaction processing system 112 via one or more payment gateways (not shown in FIG. 1). The user devices 102, 103 may include any client computing device, such as a smartphone, desktop computer, and/or the like, capable of interacting with a merchant system 106, 107. For example, the user devices 102, 103 may interact via radio frequency (e.g., Bluetooth®, NFC, RFID, and/or the like) and/or via a network (e.g., through a web browser, mobile application, and/or the like). The user devices 102, 103 in some examples may include an electronic wallet application. Although FIG. 1 shows two merchant systems 106, 107 and two user devices 102, 103, it will be appreciated that numerous merchant systems and user devices may be utilized.

Still referring to FIG. 1, the transaction processing system 112 is in communication with one or more issuer systems 114. Each issuer system 114 may utilize its own, respective authentication service to authenticate account holders and/or user devices and, based on such authentication, approve or deny authorization requests for a particular transaction. The transaction processing system 112 is in communication with an authentication system 110, which may be a separate computing device and/or may be part of the transaction processing system 112. The authentication system 110 is in communication with an authentication database 118 which stores virtual authenticators 120. It will be appreciated that the features described herein as part of the transaction processing system may also be performed by the authentication system 110 and/or a payment gateway, such that reference to the term "transaction processing system" may refer to one or more of a payment gateway, transaction processing system, and authentication system, whether separate or integrated.

The virtual authenticators 120 may include one or more data structures linking authentication data, such as device identifiers, authentication inputs, transaction history, authorization history, and/or the like, with one or more account identifiers (such as a PAN). As an example, a virtual authenticator 120 may include a software object having a plurality of parameters, associations between parameters, and one or more functions (e.g., returning an output based on an input query, such as a query for a device or authorization input that has not been previously received by a requesting entity (such as issuer system 114)). In non-limiting embodiments, each virtual authenticator 120 is associated with an authentication identifier that uniquely identifies the virtual authenticator 120. In non-limiting embodiments, the virtual authenticator 120 may include a graph data structure in which nodes representing authentication parameters are connected directly and/or indirectly. Such a graph data structure may span multiple virtual authenticators 120 such that each individual virtual authenticator 120 may represent or include a portion of a larger identity graph. In some non-limiting embodiments, the graph data structure may be separate from and linked to an identity graph including other authentication inputs, device identifiers, and/or other authentication parameters. In non-limiting embodiments, an identity graph may include or be combined with a personal identity graph that includes identification parameters such as email address, phone number, physical address, purchase history, and/or the like. Other variations are possible.

In non-limiting embodiments, a graph data structure used as a virtual authenticator 120 may change over a number of transactions. For example, various nodes in the graph, representing authentication inputs, device identifiers, network addresses (e.g., IP addresses), and/or the like, may be weighted such that the respective weights change over time. In this manner, the graph dynamically changes based on a transaction history for a PAN and/or device. For example, nodes and/or branches of the graph that are associated with a lower authentication score or are otherwise less trusted than other parts of the graph may be weighted relatively less, thereby providing some basis for use in authentication but potentially resulting in a lower overall authentication score, a refusal of authentication, a need for additional step-up authentication via another method or device, and/or the like. A graph data structure may also be used for analytics, such as identifying fraudulent patterns of activity.

The number and arrangement of systems, devices, and networks shown in FIG. 1 are provided as an example. There may be additional systems, devices and/or networks, fewer systems, devices, and/or networks, different systems, devices and/or networks, or differently arranged systems, devices, and/or networks than those shown in FIG. 1. Furthermore, two or more systems or devices shown in FIG. 1 can be implemented within a single system or a single device, or a single system or a single device shown in FIG. 1 can be implemented as multiple, distributed systems or devices. Additionally or alternatively, a set of systems or a set of devices (e.g., one or more systems, one or more devices) of system 1000 may perform one or more functions described as being performed by another set of systems or another set of devices of system 100.

Although FIG. 1 illustrates the system 1000 as including a transaction processing system 112 and issuer system 114, it will be appreciated that the system may be implemented for non-payment transactions, such as login transactions in which a user device is authenticated for accessing a resource, such as data or a service. For example, in non-limiting embodiments, the actions described to be performed by the transaction processing system 112 and/or authentication system 110 may be performed by a healthcare data management system and/or associated authentication system to interact with several different healthcare provider entities (e.g., hospitals, doctors, pharmacies, insurers, and/or the like). As such, actions described to be performed by the issuer system(s) 114 and/or merchant systems 106, 107 may be performed by a healthcare provider entity (e.g., a computing device associated with a healthcare provider entity) including hospitals, doctors' offices, laboratories, insurance companies, and/or the like. As an example, in non-limiting embodiments, the actions described to be performed by the merchant systems 106, 107 may be performed by a healthcare provider system, including systems for hospitals, doctors' offices, laboratories, and/or the like, and the actions described to be performed by issuer system(s) 114 may be performed by insurance company systems. It will be further appreciated that the system 1000 may also be implemented for other uses involving a central system (e.g., central computing device) performing the actions of transaction processing system 112 and multiple other entities (e.g., computing devices) performing the actions of the issuer system(s) 114 as described herein.

Figure 2:
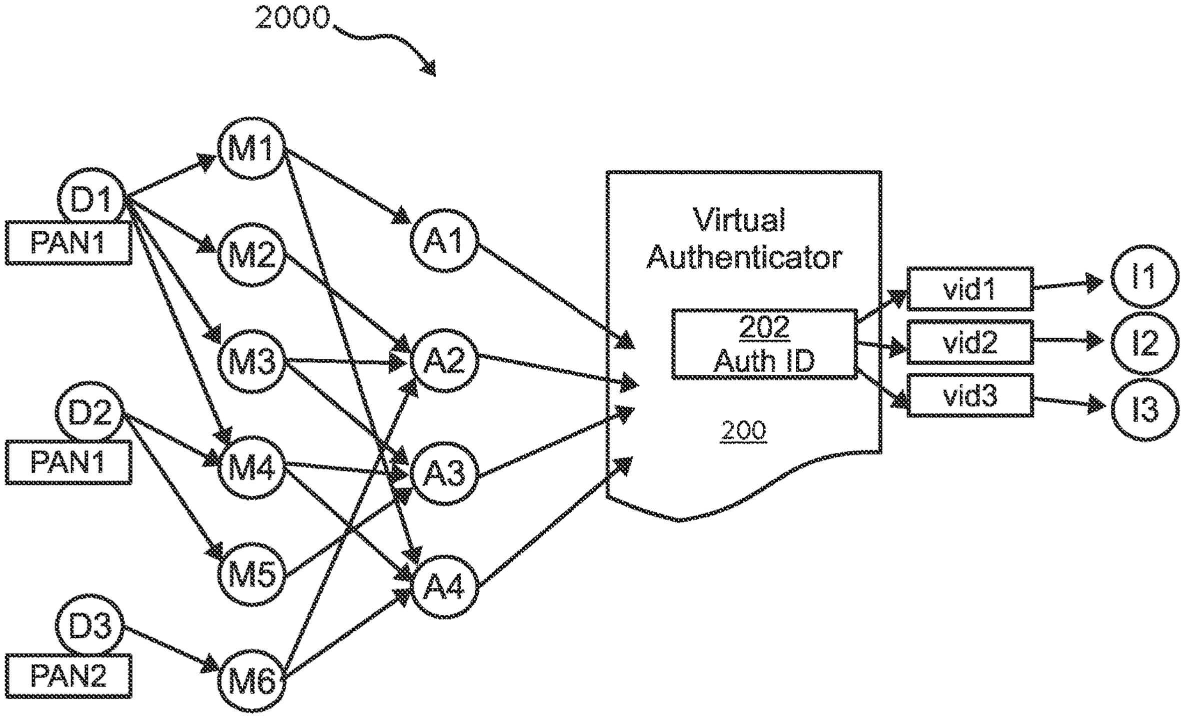
FIG. 2 is a schematic diagram of a system for authenticating devices according to non-limiting aspects or embodiments.

Referring now to FIG. 2, illustrated is another diagram of a system 2000 for authenticating devices according to non-limiting embodiments. The system 2000 includes a virtual authenticator 200 that is linked to client devices D1-D3, merchant systems M1-M6, and authentication inputs A1-A4. This authentication data is collected over a number of transactions using one or more account identifiers (e.g., PAN1 and PAN2). The devices may include a smartphone D1, a wearable device (e.g., watch) D2, and a home computing device D3, as examples. These may be used to initiate transactions with merchant systems M1-M6, which may include physical POS systems in retail establishments and/or web servers configured to accept electronic payments. The account holder of PAN1 and PAN2 may use various authentication methods (e.g., using various different types of authentication inputs). Authentication inputs A1-A4 may include, for example, biometric inputs (e.g., fingerprint, retina, voice recognition, face recognition, behavioral analysis, and/or the like), textual/character-based inputs (e.g., passwords, keys, and/or the like), identifier inputs (e.g., a network address, such as an IP address), signal-based inputs (e.g., NFC and/or Bluetooth® signals emanating from the user device), user device-based inputs (e.g., device settings or versions, browsing settings, and/or the like), peripheral device-based inputs (e.g., a YUBIKEY), and/or any other input provided by a user or user device to authenticate the user and/or user device.

With continued reference to FIG. 2, the virtual authenticator 200 may include links between devices D1-D3, merchant systems M1-M6, and authentication inputs A1-A4 with (e.g., associated with) PAN1 and PAN2, and in further association with an authentication identifier 202. Virtual identifiers vid1, vid2, vid3 may be used to identify the virtual authenticator 200 by one or more external parties, such as issuer systems I1-I3. In this manner, the external parties do not have access to the authentication identifier 202 and therefore cannot supplant the role of the virtual authenticator 200, but can still obtain authentication data from the virtual authenticator 200 with a PAN. For example, an issuer system may request an authorization history and/or transaction history, or a model score based on either or both authorization and transaction histories, associated with a PAN (e.g., PAN1). This arrangement may also prevent issuer systems I1-I3 from communicating with each other to correlate authentication information, thereby safeguarding the virtual authenticator 200 while allowing a requesting issuer system to obtain transaction data and raw authentication data (e.g., such as FIDO authentication data).

In non-limiting embodiments, the authentication identifier may be linked to a decentralized identifier for a decentralized registry external to the transaction processing system or any issuer system. For example, a virtual authenticator as described herein may be linked to one or more generic, decentralized identifiers.

Referring back to FIG. 1, user registration and a transfer of trust between user devices will be described according to non-limiting embodiments. A user may initially register with an issuer system 114 corresponding to a payment device held by the user. For example, the user may receive a registration code from the issuer system 114. The registration code may be a barcode (e.g., QR code), a numerical or textual passcode, and/or the like that is presented to the user through a device, in person, on a printed document, and/or the like. The user then scans the registration code or otherwise inputs the registration code into the user device 102, for example through a mobile application or website associated with or part of the issuer system 114. The user may also provide an authentication input to the user device 102, which is also communicated to the issuer system 114. In response to receiving the registration code, the issuer system 114 then binds the account data (e.g., account identifier or PAN) to the authentication data (e.g., authentication input, device identifier, and/or the like) in its account database 122. This information may not become part of a virtual authenticator 120 until it is used in a transaction that is processed by transaction processing system 112.

In non-limiting embodiments, additional devices may be linked to a virtual authenticator 120 explicitly or implicitly. For example, an additional user device 103 may be explicitly linked to an existing PAN and virtual authenticator 120 through direct interaction with an issuer system by transferring trust from the initial user device 102 used to register to a secondary user device 103. For example, the user may utilize a secondary user device 103 to access a website provided by the issuer system 114. Through the website, the user may communicate data including a device identifier and, in some examples, an authentication input (e.g., the same authentication input or a different authentication input than was previously provided). The issuer system 114, in response to receiving the data from a new user device 103, may automatically generate and communicate an authentication challenge to the first user device 102 that is already registered. For example, a user may be instructed to provide the authentication input and/or some other predefined input to the user device 102, proving possession of both the user device 102 and the secondary user device 103. In response to this input, the issuer system 114 may bind the device identifier of the secondary user device 103 to the existing authentication data it associated with the first user device 102 in the account database 122.

In non-limiting embodiments, an additional user device 103 and/or authentication input may be linked to a virtual authenticator 120 through a transaction (e.g., implicit linking). For example, a user may visit a merchant webpage provided by a merchant web server (e.g., merchant system 106), where the user initiates a transaction by providing credentials (e.g., a user name, password, account identifier, and/or the like) through a frame in the webpage hosted by the transaction processing system 112. The user may also provide an authentication input. The transaction processing system 112 may then link the device identifier and authentication input to existing authentication data associated with that account, thereby expanding the virtual authenticator 120. The transaction processing system may then associate the virtual authenticator 120 with a virtual identifier, or use a preexisting virtual identifier, to communicate with the issuer system 114. The user, through a mobile application or website provided by the issuer system 114, may be automatically prompted to confirm the use of the virtual authenticator 120 on the user device 102. The issuer system 114 may then store the virtual identifier associated with the virtual authenticator 120 to use in authenticating the user device 102 in future interactions.

Figure 3A:
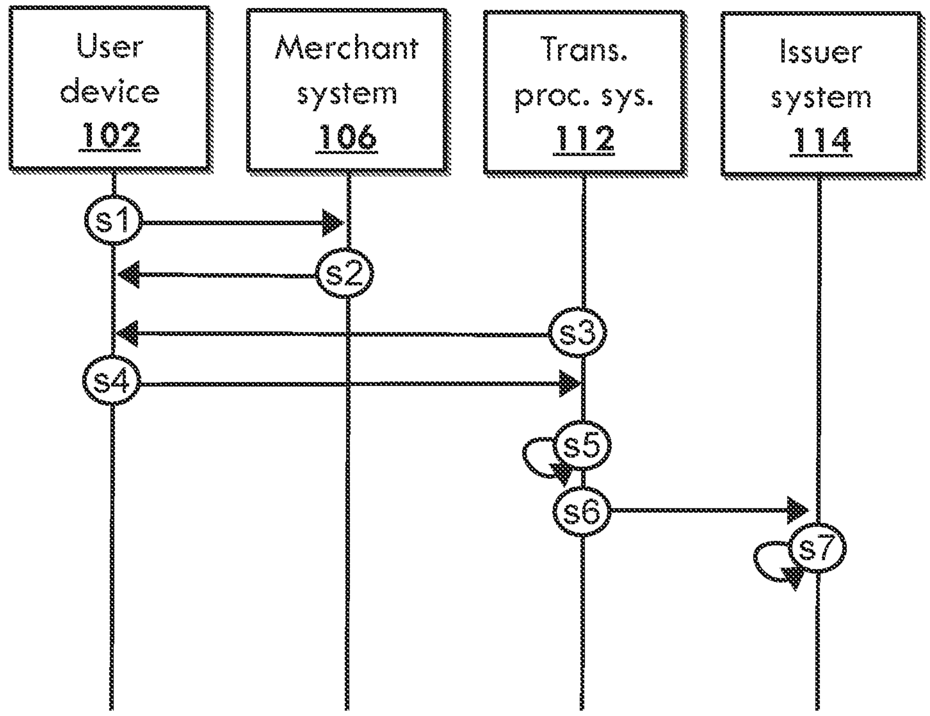
FIGS. 3A and 3B are sequence diagrams of processes for authenticating devices according to non-limiting aspects or embodiments.

Referring to FIG. 3A, a sequence diagram is shown for a method of authenticating a device according to non-limiting embodiments. At step s1, a user device 102 requests a merchant webpage or application content via a web browser or mobile application. This may include, for example, a user navigating to a merchant check-out page on an e-commerce website. At step s2, the merchant system 106 returns content (e.g., web content or structured data to display in an application) to the user device 102. The content includes a frame (e.g., such as an iFrame embedded in a merchant webpage or a pop-up dialog box embedded in a merchant webpage) pointing to the transaction processing system 112 and/or an authentication system associated with the transaction processing system 112. At step s3, the frame receives content from the transaction processing system 112 (which may refer to the transaction processing system 112, a payment gateway, and/or an authentication system that is part of or associated with the transaction processing system) and displays it along with the merchant webpage. Through the frame, the user device 102 communicates one or more authentication inputs to the transaction processing system 112 at step s4. In some examples, the user device 102 may also communicate authentication data, such as a device identifier, and transaction data, such as a PAN, at step s4.

With continued reference to FIG. 3A, at step s5 the transaction processing system 112 identifies a virtual authenticator corresponding to the PAN and/or device and links the authentication input(s), authentication data, and/or other data received from the user device 102 to the virtual authenticator. The transaction processing system 112 also identifies a virtual identifier for the virtual authenticator based on the issuer system 114 associated with the transaction (e.g., the PAN). At step s6, the transaction processing system 112 communicates an authentication output, with the virtual identifier, to the issuer system 114. The authentication output may include, for example, authentication data and/or a score as described herein. At step s7, the issuer system 114 may bind the authentication output to its own authentication database.

In addition or alternative to being used for a payment transaction, the illustrated sequence of communications may be used to verify one or more authentication parameters (e.g., such as any identity data). For example, the frame displayed through the merchant website may ask for a user of user device 102 to verify that he or she is of a certain age (e.g., 21 and over). Thus, after providing an authentication input, the user's age may be verified by the transaction processing system 112 and/or issuer system 114, where the age is an attribute linked to virtual authenticator 120. In some examples, the transaction processing system 112, if not in possession of the age for verification purposes, may query the issuer system 114 for such information with a virtual identifier, corresponding to a virtual authenticator linked to an authentication input, PAN, and/or device used by the user.

Figure 3B:
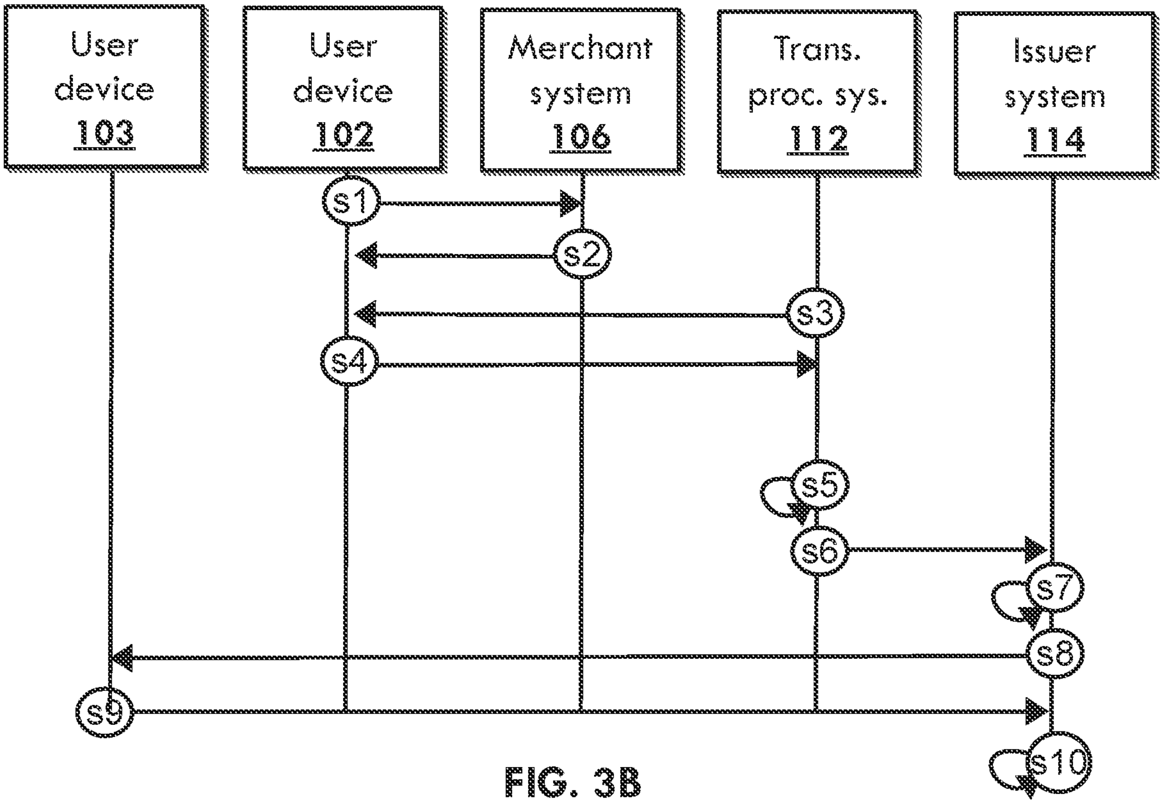

Referring to FIG. 3B, a sequence diagram is shown for a method of transferring trust to a new device shown according to non-limiting embodiments. In this example, user device 103 has been previously registered with the issuer system 114 and/or used in a previous transaction that is linked to a virtual authenticator by the transaction processing system 112. User device 102 is being used for the first time to initiate the transaction as described with respect to steps s1-s6 in FIG. 3A. In FIG. 3B, at step s7, the issuer system identifies the user device 103 based on its own authentication database. For example, the issuer authentication database may indicate that user device 103 has an issuer application installed thereon. At step s8, the issuer system 114 communicates an authentication challenge to the user device 103, such as a request for an authentication input or some other input, which is returned to the issuer system 114 at step s9. At step s10, in response to receiving a communication from user device 103 establishing that the user approves of the new device 102, the issuer system 114 may bind a device identifier of the user device 102 to its own authentication database, thus transferring trust from user device 103 to user device 102.

In non-limiting embodiments, the same device may be used and trust may be transferred from one entity (e.g., transaction processing system 112) to another entity (e.g., issuer system 114). Accordingly, in non-limiting embodiments device 102 (authenticated to the transaction processing system 112) and device 103 (authenticated to the issuer system 114) may be the same device, such that the steps and communications shown in FIG. 3B to be associated with device 102 and device 103 are performed by a single device. For example, a device 102 (such as a smartphone) may have multiple authentication inputs associated with it (e.g., face recognition, finger print recognition, and voice recognition, as examples) and a distinct credential (e.g., such as a private key and user/device identifier) stored for pairing of a virtual authenticator with each relying party (e.g., each entity seeking authentication). In some non-limiting embodiments, both the merchant system 106 and issuer system 114 may be initially enrolled with the transaction processing system 112 for authentication services, such that linking the virtual authenticator occurs as a result of the transaction processing system 112 already performing authentication for both entities.

In non-limiting embodiments, the actions described to be performed by the transaction processing system 112 in FIGS. 3A and 3B may be performed by a healthcare data management system and/or associated authentication system to interact with several different healthcare provider entities (e.g., hospitals, doctors, pharmacies, insurers, and/or the like). Further, in non-limiting embodiments, actions described to be performed by the issuer system(s) 114 and/or merchant systems 106, 107 may be performed by a healthcare provider entity (e.g., a computing device associated with a healthcare provider entity) including hospitals, doctors' offices, laboratories, insurance companies, and/or the like. As an example, in non-limiting embodiments, the actions described to be performed by the merchant systems 106, 107 may be performed by a healthcare provider system, including systems for hospitals, doctors' offices, laboratories, and/or the like, and the actions described to be performed by issuer system(s) 114 may be performed by insurance company systems. It will be further appreciated that the system may also be implemented for other uses involving a central system (e.g., central computing device) performing the actions of transaction processing system 112 and multiple other entities (e.g., computing devices) performing the actions of the issuer system(s) 114 and merchant systems 106, 107 as described herein.

Referring back to FIG. 1, in non-limiting embodiments, the virtual authenticator 120 may be used to authenticate a user device 102 in real-time during a transaction. For example, at a merchant POS device (e.g., merchant system 106), a user may present his or her smartphone (e.g., user device 102) to conduct a contactless NFC transaction. In other examples, a user may access a merchant website through a user device 102 to conduct a transaction with an electronic wallet or a payment account. The merchant system 106 may communicate a transaction request message to the transaction processing system 112 including an authentication input (which may include, as an example, a signature of the NFC communication, device information, and/or the like), and the transaction processing system 112 may then generate and communicate an authorization request message to the issuer system 114 that includes a virtual identifier associated with a virtual authenticator 120, which is linked to a PAN and/or the user device 102 used to initiate a transaction.

Because the virtual authenticator 120 is dynamically updated over time with transaction histories, the transaction processing system 112 can generate an authentication score based on the virtual authenticator 120 (including, for example, a graph data structure representing authentication data and a transaction history) rather than only generating a score for the individual transaction. For example, after linking transaction data to the virtual authenticator 120 while processing the transaction, an authentication score may then be determined based on the updated virtual authenticator 120.

Figure 4:
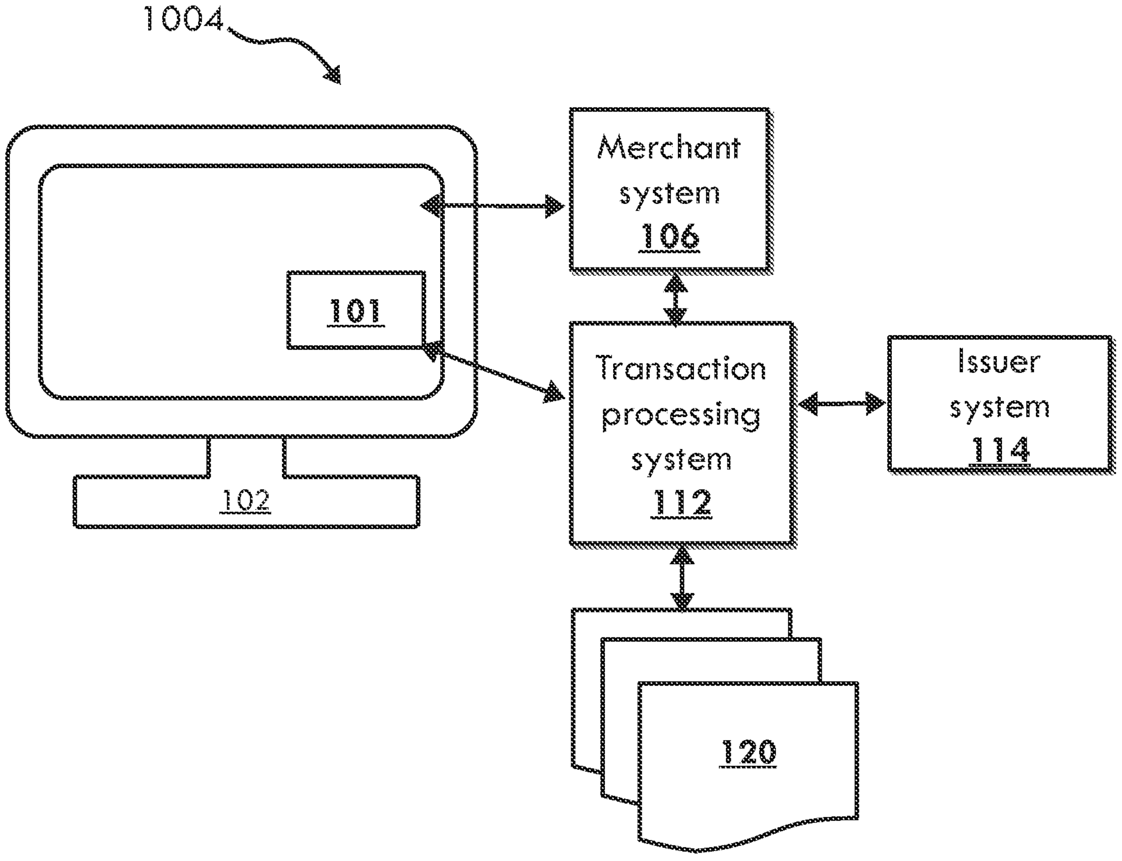
FIG. 4 is a schematic diagram of a system for authenticating devices according to non-limiting aspects or embodiments.

Referring to FIG. 4, an implementation of a system 1004 for authenticating devices is shown according to non-limiting embodiments. A frame 101 in a merchant webpage displayed on user device 102 is in communication with the transaction processing system 112 (including, for example, an authentication system that is part of and/or separate but associated with the transaction processing system 112). Although the frame 101 is shown as an embedded page (e.g., iFrame), it will be appreciated that such content may also be displayed in a pop-up window and/or the like. In this example, a user of user device 102 may seek to create a new account with the merchant system 106. In some examples, the user may seek to open a new account with a different issuer system (e.g., a bank other than issuer system 114) or any service provider, in which case such entity would be in the role of merchant system 106 providing content to the user device 102 (via, for example, a webpage or mobile application).

With continued reference to FIG. 4, a user may provide an authentication input to the frame 101, such as a finger swipe, credentials, and/or the like, which is communicated to the transaction processing system 112. The transaction processing system 112 may then generate a unique identifier for the merchant, authenticator, and/or user and an authentication score based on a virtual authenticator 120 linked to the input provided to the frame 101. The authentication score may then be communicated to the frame 101 and, in some examples, be passed to the merchant system 106 through the user device 102 (e.g., by communicating the score from the frame 101 to the user device 102 and then to the merchant system 106 through, for example, a web browser). In other non-limiting embodiments, the merchant system 106 may receive the unique identifier and, using the unique identifier, query the transaction processing system 112 for the score. As an example, the unique identifier may be obtained at a login process and the score may be obtained before accepting the transaction. The merchant system 106 may then make its own authentication determination based on the score and/or any other data it may request from the user.

In non-limiting embodiments, the systems and methods described herein for authenticating devices may be used for electronic contracts (e.g., including smart contracts). For example, the transaction processing system 112 may maintain a ledger including a registry of contracts between different users (having different user devices). In such examples, the transaction processing system 112 may manage asymmetric key pairs for use by the user devices to digitally sign contracts. In this manner, the transaction processing system 112 or some other entity may utilize virtual authenticators 120 to connect users' keys to authentication data, such as through a linked identity graph.

The virtual authenticator 200 may be used to generate a score, as discussed in U.S. patent application Ser. No.

16/548,944, titled "Systems, Methods, and Computer Program Products for Authenticating Devices", filed on Aug. 23, 2019, the disclosure of which is hereby incorporated by reference in its entirety. Such a score may not only be used for authenticating a device for a payment transaction, but may also be used for any other authentication event such as account creation, account recovery, account access, electronic contracts, and/or the like.

Figure 5:
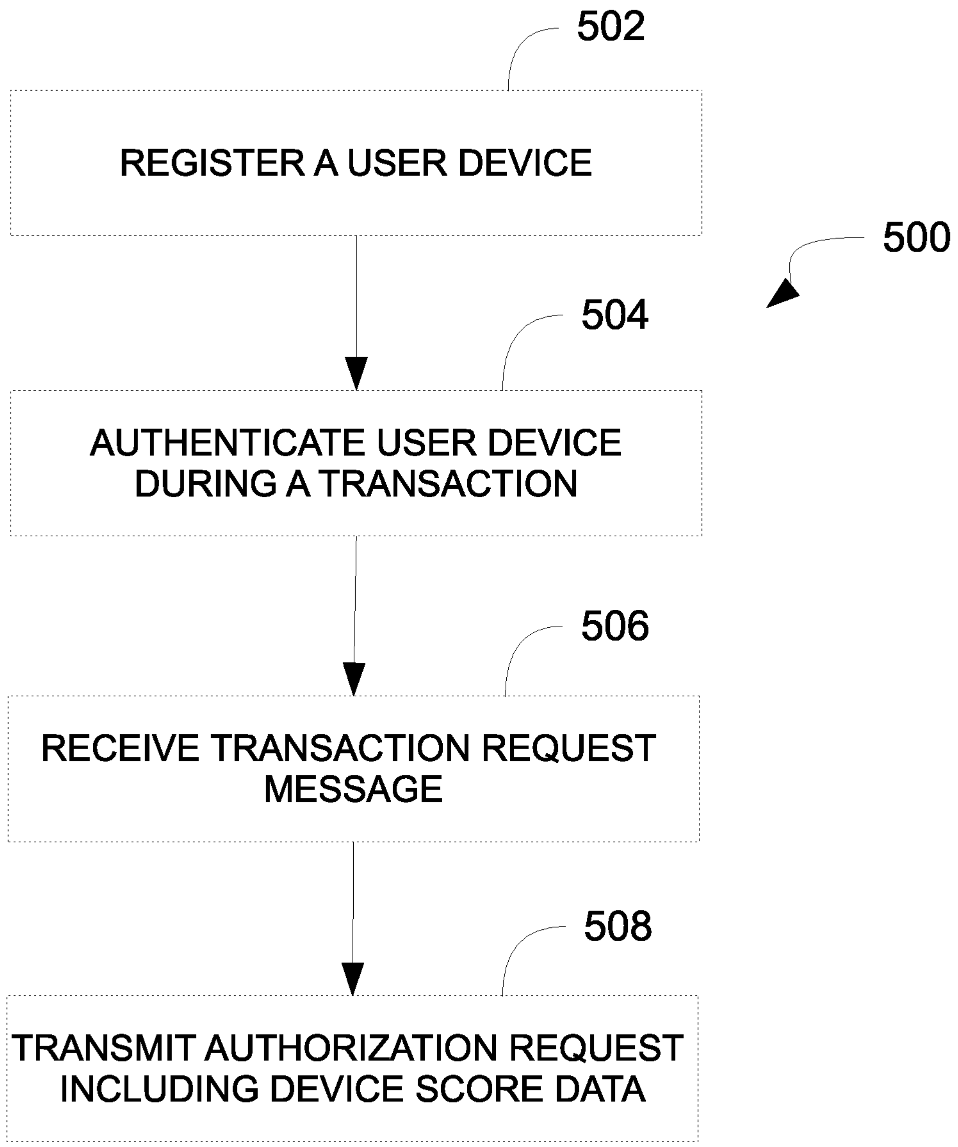
FIG. 5 is a flow diagram of a process for authenticating devices according to non-limiting aspects or embodiments.

Referring now to FIG. 5, illustrated is a flow diagram of a process 500 for authenticating devices according to non-limiting aspects or embodiments. In some non-limiting aspects or embodiments, one or more of the steps of process 500 may be performed (e.g., completely, partially, etc.) by an authentication system 110 (e.g., an authentication system 110 part of a transaction processing system 112, payment gateway system, and/or the like). As illustrated in FIG. 5, at step 502, process 500 may include registering a user device 102. In some non-limiting embodiments, a user device 102 may register with an authentication system 110 or through an issuer system 114. For example, the user device 102 may register with the authentication system 110 by transmitting registration data associated with registration of the user device 102 to the authentication system 110. In some non-limiting embodiments, the authentication system 110 may be maintained by a first merchant system 106, a second merchant system 107, a payment gateway system, a transaction processing system 112, and/or an issuer system 114.

In some non-limiting embodiments, registration data associated with registration of a user device 102 may include one or more of a public key of the user device 102, a private key of the user device 102, and/or a unique device identifier of the user device 102 (e.g., identification data associated with identification of a device, a media access control (MAC) address, a unique application identifier of an authentication application stored on the user device 102, and/or the like). For example, the user device 102 may generate the public key and/or the private key to encrypt and/or decrypt data transmitted to and/or received from the user device 102, a first merchant system 106, a second merchant system 107, a payment gateway, an authentication system 110, a transaction processing system 112, and/or an issuer system 114. In such an example, the public key and/or the private key may be generated by the authentication application executed on the user device 102. In another example, the user device 102 may be assigned the public key and/or the private key by the authentication system 110. In some non-limiting embodiments, registration data may include data used to derive and establish a shared secret between the user device 102 and the authentication system 110. In such examples, the public key, the private key, the unique device identifier, and/or the shared secret may be associated with the device score of the user device 102.

In some non-limiting embodiments, the authentication system 110 may register the user device 102. For example, the authentication system 110 may register the user device 102 with one or more accounts (e.g., an account associated with a first merchant system 106 and/or an account associated with a second merchant system 107). In such an example, the authentication system 110 may register the user device 102 with the one or more accounts by linking one or more unique device identifiers of the user device 102 (e.g., a unique application identifier associated with an authentication application installed on user device 102, a MAC address of the user device 102, an identifier assigned to the user device 102 by the authentication system 110, and/or the like) with the one or more accounts. In another example, the authentication system 110 may register the user device 102 by linking the one or more unique device identifiers of the user device 102 with device score data associated with a device score (e.g., a value associated with an indication as to the likelihood that communications with the user device 102 are authentic, a value associated with an indication as to the likelihood that transactions involving the user device 102 will later be subject to a chargeback transaction, a value associated with a confidence level indicating the likelihood that the device score accurately reflects the likelihood that communications with the user device 102 are authentic, and/or the like). For example, the authentication system 110 may determine the device score data associated with the device score for the user device 102 and, upon determination, may link the user device 102 with the device score by associating the unique device identifier with the device score data maintained by the authentication system 110. In this way, the authentication system 110 may determine and/or update the device score linked to the user device 102 based on activity (e.g., transactions involving the user device 102) between the user device 102 and both the first merchant system 106 and the second merchant system 107.

In some non-limiting embodiments, registration of the user device 102 may include determining the device score data associated with a device score. For example, the authentication system 110 may determine that the device score linked to the user device corresponds to a default device score. In another example, the authentication system 110 may determine that the device score linked to the user device 102 is associated with a device score linked to another device. For example, the authentication system 110 may determine that the device score linked to the user device 102 is associated with the device score linked to a user device 102 that was previously registered with the authentication system 110 (e.g., the same user device 102 and/or a different user device 102). In such an example, after receiving registration data associated with registration of the user device 102, the authentication system 110 may transmit a new device registration message to the user device 102 that was previously registered with authentication system 110. The authentication system 110 may then receive a new device response message from the user device 102 that was previously registered with authentication system 110 indicating whether the user device 102 is permitted to register with the authentication system 110. Where the new device response message includes an indication that the user device 102 is permitted to register with the authentication system 110, the authentication system 110 may determine the device score of the user device based on the device score of the user device 102 that was previously registered with authentication system 110 (e.g., that the device score linked to the user device 102 is greater than, equal to, or less than the device score linked to the user device 102 that was previously registered with the authentication system 110). Where the authentication response message includes an indication that the user device 102 is not permitted to register with the authentication system 110, the authentication system 110 may forego registering the user device 102 and/or may forego determining the device score of the user device 102 based on the device score of the user device 102 that was previously registered with authentication system 110. In some non-limiting embodiments, the device score linked to the user device 102 may be updated (e.g., incremented or decremented) to generate a device score that is linked with the user device 102 and/or the authentication application based on updates to the device score associated with the user device 102 that was previously registered with authentication system 110. Similarly, the device score linked to the user device 102 that was previously registered with authentication system 110 may be updated based on updates to the device score associated with the user device 102. In this way, the device score of the user device 102 may be linked to the device score of the user device 102 that was previously registered with the authentication system 110.

In some non-limiting embodiments, the device score linked to the user device 102 may be determined based on whether the user device 102 is registering from an internet protocol (IP) address associated with a user device 102 that was previously registered with the authentication system 110 using that IP address. For example, the authentication system 110 may determine that the device score linked to the user device 102 is associated with a value greater than a value of a default score where the user device 102 is registering from an IP address that the user device 102 that was previously registered with authentication system 110 used to register with the authentication system 110. In another example, the authentication system 110 may determine that the device score linked to the user device 102 is associated with a value less than or equal to a value of a default score where the user device 102 is registering from an IP address that was not used during a previous registration.

In some non-limiting embodiments, the authentication system 110 may determine the device score linked to the user device 102 based on determining whether the IP address associated with the user device 102 used during a transaction geolocates (e.g., is associated with a geographic area) to an area where one or more transactions of an account associated with the user device 102 were initiated. For example, where authentication system 110 determines that user device 102 geolocates to an area where one or more transactions of an account associated with the user device 102 were initiated, authentication system 110 may determine that the device score linked to the user device 102 is a value greater than or less than the default score that user device 102 would be linked to. In another example, where the authentication system 110 determines that the user device 102 geolocates to an area where one or more transactions of an account associated with the user device 102 were not initiated, the authentication system 110 may forego determining that the device score is a value greater than or less than the default score.

In some non-limiting embodiments, the user device 102 may transmit the registration data associated with registration of the user device 102 to the authentication system 110 after authenticating the user at user device 102.

In some non-limiting embodiments, the user device 102 may authenticate a user operating the user device 102 by displaying a local authentication request (e.g., a prompt indicating a request for the user to provide input at the user device 102 to authenticate themselves) by querying a security device associated with the user device 102, such as a hardware token, a security key stored in a universal serial bus (USB) key, by determining a token stored in storage segmented from the main memory of the user device 102, and/or the like. For example, the user device 102 may display the local authentication request and, in response, the user device 102 may receive input associated with a local authentication response. The local authentication response may include data received as input at the user device 102 such as, without limitation, identifying data associated with an identifier of a user identity (e.g., a personal identification number (PIN)), fingerprint data associated with a fingerprint of the user (e.g., a biometric measurement captured by a fingerprint scanner located on or otherwise in communication with the user device 102), facial image data associated with a facial image of the user (e.g., received via a two-dimensional (2D) and/or a three-dimensional (3D) camera associated with the user device 102), and/or the like. The local authentication response may be compared to identifying data associated with an identifier of a user, the identifying data maintained by user device 102 in memory. Based on the comparison of the local authorization response and the identifying data, the user device 102 may authenticate the user. In some non-limiting embodiments, after authenticating the user, user device 102 may transmit a device authentication response message to the authentication system 110 to indicate that the user was authenticated.

As further illustrated in FIG. 5, at step 504, process 500 may include authenticating a device during a transaction. In some non-limiting embodiments, authenticating a device (e.g., a user device 102) during a transaction may occur prior to or during the transmission of product data associated with one or more products from a first merchant system 106 or a second merchant system 107 to the user device 102, prior to or during transmission of a transaction request message including transaction data associated with a transaction and/or transaction data associated with the transaction from the user device 102 to the first merchant system 106 or the second merchant system 107, prior to or during transmission of the transaction request message from the first merchant system 106 or the second merchant system 107 to a payment gateway and/or a transaction processing system 112, and/or prior to or during transmission of an authorization request message from the payment gateway and/or the transaction processing system 112 to an issuer system 114. In some non-limiting embodiments, once authenticated, the user device 102 and/or the first merchant system 106 or the second merchant system 107 may receive a device authentication identifier message including a device authentication identifier (e.g., a unique device identifier of user device 102 generated for use during one or more transactions by the authentication system 110, a device authentication token of user device 102, and/or the like) from the authentication system 110 to be used during the transaction to identify the user device 102.

In some non-limiting embodiments, the user device 102 may request first website data associated with a first website maintained by a first merchant system 106 or a second merchant system 107 to initiate a transaction. The first website data may include data associated with rendering a webpage (e.g., a product page including product data associated with one or more products available for purchase). In some non-limiting embodiments, the user device 102 may display the one or more goods and/or services on an output component of the user device 102, such as a display screen. For example, the user device 102 may display the one or more goods and/or services available for purchase via the webpage based on the first website data. In such an example, the first merchant system 106 or the second merchant system 107 may transmit the first website data to the user device 102 to cause the user device 102 to display the webpage of the first website. In some non-limiting embodiments, the first website data may be used by the user device 102 (e.g., via a browser executed on the user device 102) to authenticate the user device 102, as described herein.

In some non-limiting embodiments, second website data associated with a second website may be used to authenticate the user device 102. For example, the user device 102 may communicate via a second webpage of the second website to authenticate itself with the first merchant system 106 or the second merchant system 107, the second webpage embedded in the first webpage (e.g., with frames), as described in embodiments herein. In some non-limiting embodiments, the first website may be hosted by a first domain and the second website may be hosted by a second domain different from the first domain.

In some non-limiting embodiments, the user device 102 may be authenticated via a second webpage embedded in a first webpage. For example, second webpage data associated with the second webpage rendered via a frame (e.g., an inline frame (iFrame), and/or the like) included in the first webpage may be transmitted to the user device 102. In such an example, the second webpage data may be transmitted from the authentication system 110 hosted by the payment gateway. In some non-limiting embodiments, the user device 102 may establish communication with the authentication system 110 based on receiving the second webpage data to verify that the user device 102 is authentic. In some non-limiting embodiments, rendering the second webpage may include rendering an invisible second webpage via the frame to establish communication between the user device 102 and the authentication system 110 during authentication of the user device 102. When communicating via the invisible second webpage, authentication of the user device 102 may be silent (e.g., the user device 102 may not render an image which is visible to the user during authentication, the user device 102 may render an image indicating that authentication is occurring without requesting the user provide input to the user device 102, and/or the like).

In some non-limiting embodiments, the user device 102 may be authenticated via a second webpage presented in a separate browser window (e.g., a pop-up window) invoked from code within the first webpage. For example, in some non-limiting embodiments, second webpage data associated with a second webpage (e.g., a second webpage rendered via a pop-up window) may be transmitted to a user device 102 based on the first webpage data. In such an example, the first webpage data may include code configured to cause the web browser rendering the first webpage to open a new window and to retrieve the second webpage data associated with the second webpage. The second webpage data associated with the second webpage may be retrieved from a domain different from the domain that provided the first webpage.

In some non-limiting embodiments, the authentication system 110 may generate challenge data associated with the challenge. For example, the authentication system 110 may generate challenge data associated with a challenge based on receiving a device authentication identifier request message from a user device 102 and/or a transaction request message from a first merchant system 106 or a second merchant system 107. The device authentication identifier request message may include a request for a device authentication identifier. Additionally or alternatively, the authentication system 110 may generate the challenge data based on receipt of a transaction request message at a payment gateway. In some non-limiting embodiments, once the challenge data is generated, the authentication system 110 may transmit the challenge data to the user device 102 included in a device authentication request message. For example, the authentication system 110 may transmit the device authentication request message to the user device 102 via the second webpage to cause the user device 102 to generate and transmit a device authentication response message including challenge response data associated with a challenge response. Additionally or alternatively, the authentication system 110 may transmit the device authentication response message to the user device 102 via the first merchant system 106 and/or via a communication network (e.g., by establishing communication with the user device 102 separate from the first or second webpages).

In some non-limiting embodiments, the user device 102 may generate the challenge response data associated with the challenge response included in the device authentication response message based on the challenge data associated with the challenge. For example, the user device 102 may generate the challenge response data associated with the challenge response included in the device authentication response message by digitally signing the challenge data (or data derived from the challenge data, such as a hash) with the private key of the user device 102. In some non-limiting embodiments, the user device 102 may encrypt the challenge data based on encryption data associated with a private key and/or a public key of the user device 102 to generate the challenge response data associated with the challenge response. In such an example, the user device 102 may digitally sign the challenge data by encrypting the challenge data (or data derived therefrom) with the private key to enable the authentication system 110 to determine that the user device 102 is authentic (e.g., by decrypting the encrypted challenge data with the public key of the user device 102). In some non-limiting embodiments, the user device 102 may prompt the user to authenticate themselves when generating the challenge response data. In such an example, the user device 102 may forego generating the challenge response data until the user is successfully authenticated at the user device 102 during a local authentication request. In some non-limiting embodiments, the user device 102 may include the challenge response data with transaction data prior to transmitting the transaction data to the first merchant system 106 or the second merchant system 107.

In some non-limiting embodiments, the user device 102 may query a security device (e.g., a hardware token, a software token, and/or the like used to authenticate the user device 102) associated with the user device 102 when generating the challenge response data. For example, the user device 102 may generate the challenge response data based on data received from the security device. In some non-limiting embodiments, the user device 102 may include a unique device identifier associated with the user device 102 with the challenge response data associated with the challenge response. For example, where the user device 102 determines the transaction is being performed with the first merchant system 106, the user device 102 may include a unique device identifier associated with the user device 102 and the first merchant system 106 in the transaction data and/or the challenge response data, whereas where the user device 102 determines the transaction is being performed with a second merchant system 107, the user device 102 may include a unique device identifier associated with the user device 102 and the second merchant system 107 in the transaction data and/or the challenge response data via the device authentication response message. The user device 102 may then transmit the challenge response data to the first merchant system 106, the second merchant system 107, and/or the authentication system 110.

In some non-limiting embodiments, the challenge data associated with the challenge may be transmitted by the first merchant system 106 or the second merchant system 107 via a device authentication request message to the user device 102. For example, the first merchant system 106 or the second merchant system 107 may host an authentication system similar to authentication system 110. The authentication system may generate challenge data associated with a device challenge and transmit the device authentication request message including the challenge data associated with the challenge to the user device 102. For example, the authentication system 110 may generate challenge data and transmit the device authentication request message including the challenge data associated with the device challenge to the user device 102 based on an attempt by the user device 102 to login to the first webpage and/or based on receiving transaction data associated with a transaction from the user device 102. The user device 102 may then process the challenge data to generate challenge response data associated with a challenge response via a device authentication response message and transmit the device authentication response message to the first merchant system 106 or the second merchant system 107, respectively. In some non-limiting embodiments, the challenge data may cause the user device 102 to prompt the user to authenticate themselves in accordance with a local authentication request. In such an example, the user device 102 may not generate challenge response data until the user is successfully authenticated at the user device 102.

In some non-limiting embodiments, the user device 102 may be authenticated by an authentication system 110. For example, the authentication system 110 may determine a user device 102 is authentic based on challenge response data associated with a challenge response received via a device authentication response message. In some non-limiting embodiments, the challenge response data associated with the challenge response may be compared to the challenge data associated with the challenge and/or registration data associated with registration of the user device 102 received during registration of a user device 102. For example, an authentication system 110 may verify a user device 102 as authentic by decrypting the challenge response data associated with the challenge with the public key associated with the user device 102 and comparing the decrypted challenge response data to the challenge data transmitted to the user device 102. In such an example, where the challenge response data is generated by digitally signing the challenge data (or data derived from the challenge data) with a private key of the user device 102, the challenge response data may be processed according to a digital signature verification algorithm to verify that the user of the user device 102 is in possession of the authentic private key. In some non-limiting embodiments, based on the comparison of the challenge response data that was decrypted and challenge data, the authentication system 110 may determine that a device that transmitted the challenge response data (and, in some non-limiting embodiments, the transaction request message) is or is not the user device 102 that was registered and, therefore, is or is not authentic.

In some non-limiting embodiments, a device authentication identifier associated with a user device 102 may be transmitted to the user device 102. For example, the device authentication identifier may be generated by the authentication system 110 and transmitted via a device authentication identifier message to the user device 102 based on successful authentication of the user device 102. In some non-limiting embodiments, the user device 102 may transmit the device authentication identifier to the first merchant system 106 or the second merchant system 107 with the transaction data associated with the transaction via the transaction request message. In some non-limiting embodiments, the first merchant system 106 or the second merchant system 107 may include the device authentication identifier in a transaction request message when generating the transaction request message during a transaction, as described herein.

In some non-limiting embodiments, the user device 102 may determine transaction data associated with a transaction. For example, in some non-limiting embodiments, a user device 102 may determine transaction data associated with a transaction based on product data associated with one or more products received via the first webpage and input received at the user device 102. In some non-limiting embodiments, the transaction data may include account data associated with an account maintained by an issuer system 114 on behalf of a user for making a payment to complete the transaction, address data associated with an address for delivery of the goods and/or services associated with the transaction, and/or the like. For example, a user device 102 may receive input identifying an account identifier, account holder name, account expiration date, account verification number, a unique device identifier, and/or the like.

In some non-limiting embodiments, the user device 102 may transmit the transaction data associated with a transaction via a transaction request message. For example, the user device 102 may transmit the transaction data associated with the transaction via the transaction request message to the first merchant system 106 or the second merchant system 107. In some non-limiting embodiments, the user device 102 may transmit the transaction request message after receiving a request from the first merchant system 106 or the second merchant system 107 for the transaction request message to complete the transaction. In some non-limiting embodiments, the transaction data transmitted via the transaction request message may further include the device authentication identifier associated with a user device 102. For example, the user device 102 may include the device authentication identifier received during authentication of the user device 102 with the transaction request message. In such an example, the user device 102 may transmit the transaction request message to the first merchant system 106 or the second merchant system 107 during the transaction.

As further illustrated in FIG. 5, at step 506, process 500 may include receiving a transaction request message. In some non-limiting embodiments, a payment gateway and/or a transaction processing system 112 may receive a transaction request message associated with a transaction from the first merchant system 106 or the second merchant system 107. The transaction request message may include the device authentication identifier and/or the transaction data associated with the transaction. In some non-limiting embodiments, the transaction request message may also include challenge response data associated with a challenge response and/or a device authentication identifier. In some non-limiting embodiments, the first merchant system 106 or the second merchant system 107 may transmit the transaction request message to the payment gateway and/or the transaction processing system 112 after receiving the transaction request message from the user device 102. In some non-limiting embodiments, the first merchant system 106 or the second merchant system 107 may include the device authentication identifier in the transaction request message before transmitting the transaction request message to the payment gateway and/or the transaction processing system 112.

In some non-limiting embodiments, the payment gateway and/or the transaction processing system 112 may generate an authorization request message based on the transaction request message. For example, the payment gateway and/or the transaction processing system 112 may generate the authorization request message based on the transaction request message and based on determining a device score linked to the user device 102. In such an example, the payment gateway and/or the transaction processing system 112 may query the authentication system 110 to determine the device score linked to the user device 102 by transmitting the device authentication identifier to the authentication system 110. The authentication system 110 may perform a lookup of the device score in a database associated with the authentication system 110 and transmit the device score to the payment gateway and/or the transaction processing system 112 generating the authorization request message. The payment gateway and/or the transaction processing system 112 may include the device score in the authorization request message. For example, the payment gateway and/or the transaction processing system 112 may generate the authorization request message based on, among other features, the transaction data associated with the transaction, the challenge response data associated with the challenge response, and/or the device score data associated with the device score.

In some non-limiting embodiments, authentication of a user device 102 may occur in response to receiving a transaction request message or an authorization request message. For example, in some non-limiting embodiments, the user device 102 may not be authenticated prior to generation of a transaction request message. In such examples, a device authentication identifier may not be included in the transaction request message and/or the authorization request message and, as such, the payment gateway system, transaction processing system 112, and/or issuer system 114 may query the authentication system 110 for device score data associated with a device score of the user device 102. The authentication system 110 may look up the device score data associated with the device score of the user device 102 based on a unique device identifier included in the transaction request message and/or the authorization request message, and return the device score data associated with the device score and/or a device authentication identifier message including a device authentication identifier to the payment gateway, transaction processing system 112, and/or issuer system 114 that transmitted the unique device identifier to the authentication system 110 when querying the authentication system 110. In such examples, the authentication system 110 may be included in the payment gateway, the transaction processing system 112, and/or the issuer system 114 to reduce latency when performing a lookup to retrieve the device score data associated with the device score of the user device 102.

In some non-limiting embodiments, the first merchant system 106, the second merchant system 107, the payment gateway, and/or the transaction processing system 112 may query the authentication system 110 to cause the authentication system to authenticate the user device 102. For example, the first merchant system 106, the second merchant system 107, the payment gateway and/or the transaction processing system 112 may transmit a request to the authentication system 110 to cause the authentication system 110 to authenticate the user device 102. In such an example, the authentication system 110 may authenticate the user device 102 by transmitting a device authentication request message to the user device 102 to cause the user device 102 to generate and transmit a device authentication response message back to the authentication system 110 indicating whether the user device 102 is authentic. Where the authentication system 110 determines that the user device 102 is authentic, the authentication system 110 may transmit a device authentication identifier message to the first merchant system 106 or the second merchant system 107 that requested authentication of the user device 102. In some non-limiting embodiments, the authentication system 110 may transmit device authentication identifiers that are different, the device authentication identifiers associated with the user device 102 and either the first merchant system 106 or the second merchant system 107 to reduce the chances of either a merchant and/or a third party using the device authentication identifier in a manner not intended. Additionally or alternatively, the device authentication identifiers transmitted via device authentication identifier messages to the first merchant system 106 or the second merchant system 107 may be for one-time use.

As further illustrated in FIG. 5, at step 508, process 500 may include transmitting an authorization request message including a device score. In some non-limiting embodiments, a payment gateway and/or a transaction processing system 112 may transmit the authorization request message. For example, the payment gateway and/or the transaction processing system 112 may transmit the authorization request message to an issuer system 114. In some non-limiting embodiments, the authorization request message may include (e.g., may attach thereto, may incorporate, may provide, and/or the like) transaction data associated with a transaction and/or device score data associated with a device score of user device 102. In some non-limiting embodiments, the issuer system 114 may generate an authorization response message associated with disposition of the transaction including an indication as to whether the transaction was approved or not approved, whether the issuer system 114 recommends updating the device score data based on disposition of the transaction, and/or the like. For example, the issuer system 114 may generate an authorization response message based on the transaction data and/or the device score data included in the authorization request message. The device score data may be inserted into the authorization request message by the payment gateway and/or the transaction processing system 112 as a new field, using an existing field, in combination with other data, and/or the like.

In some non-limiting embodiments, an issuer system 114 may transmit score adjustment data associated with an adjustment factor (e.g., an amount and/or a proportion by which a device score is to be updated). For example, in some non-limiting embodiments, an issuer system 114 may transmit score adjustment data associated with an adjustment factor to be applied to update a device score maintained by an authentication system 110. In such examples, the issuer system 114 may determine the adjustment factor based on receiving and processing an authorization request message. For example, the issuer system 114 may determine an adjustment factor based on determining an authorization request message is associated with a transaction that is approved or declined. Additionally or alternatively, a device score may be updated based on the final disposition of a transaction. For example, a payment gateway, a transaction processing system 112, and/or the issuer system 114 may update a device score based on determining whether a chargeback (e.g., a reversal of a transaction) was posted to the account within a period of time after the transaction was initiated (e.g., within 45 days, 60 days, 90 days, and/or the like). The payment gateway, transaction processing system 112, and/or issuer system 114 may transmit data associated with the final disposition of the transaction to the authentication system 110. In such an example, the authentication system 110 may update the device score of the user device 102 based on the data associated with the final disposition of the transaction. For example, where a transaction is approved and/or no chargeback is identified as having occurred within a period of time, the authentication system 110 may update the device score by upgrading the device score. In another example, where the transaction is not approved and/or a chargeback is identified as having occurred within the period of time, the authentication system 110 may update the device score by degrading the device score.

In some non-limiting embodiments, device score data associated with the device score may be updated at an authentication system 110 based on generation of score adjustment data by the payment gateway and/or the transaction processing system 112. For example, the payment gateway and/or the transaction processing system 112 may generate score adjustment data based on receiving an authorization response message at the payment gateway and/or a transaction processing system 112 indicating the transaction was approved or not approved. The payment gateway and/or the transaction processing system 112 may then transmit the score adjustment data to the authentication system 110 to cause the authentication system 110 to update the device score.

In some non-limiting embodiments, device score data associated with a device score may be updated by the authentication system 110. For example, the device score data associated with a device score may be updated by the authentication system 110 during a transaction (e.g., an initial transaction and/or one or more subsequent transactions that are associated with a first merchant system 106 and/or a second merchant system 107), based on one or more factors determined during a transaction. Such factors may include, without limitation, whether the transaction was approved or not approved by an issuer system 114, the value of the transaction (e.g., the authentication system 110 may update the device score of the user device 102 by a first amount that is greater than a second amount when associated with a transaction that is for a higher value than a transaction that is associated with a lower value), the amount of transactions initiated by the user device 102 within a period of time, whether the user device 102 provided a cookie (e.g., a web cookie, an Internet cookie, and/or the like) to the authentication system 110 and/or the merchant system 106 during the transaction, a time zone associated with the transaction (e.g., the time zone in which the user device 102 initiated the transaction), a geolocation associated with the transaction (e.g., an area in which the user device 102 initiated the transaction), the behavior of the user device 102 during one or more transactions, a language associated with the transaction, metadata associated with the transaction, the type of website visited during the transaction, a merchant category associated with the merchant involved in the transaction, and/or the like).

In some non-limiting embodiments, the device data associated with the device score of the user device 102 may be updated based on a transaction history of a PAN associated with the user device 102 (e.g., an account issued by the issuer system 114, an account issued by another issuer system, and/or the like). In such an example, the authentication system 110 may determine that the device score of the user device 102 should be incremented where activity associated with the PAN indicates that the transaction history is positive (e.g., where no chargebacks are associated with the PAN and/or the like). In another example, the authentication system 110 may determine that the device score of the user device 102 should be decremented where activity associated with the PAN indicates that the transaction history is negative (e.g., one or more chargebacks are associated with the PAN and/or the like). Additionally or alternatively, the device data associated with the device score of the user device 102 may be updated based on device score data associated with devices that have a similar history (e.g., where the device scores are associated with transactions involving the sale of one or more of the same items, one or more of the same services, and/or the like) as user device 102. For example, the authentication system 110 may update the device data associated with the device score of the user device 102 based on the device score data associated with devices that have a similar history where the history of the user device 102 and the devices that have the similar history both include purchases of the same or similar goods and/or services.

In some non-limiting embodiments, device score data associated with the user device 102 may be updated based on site score data associated with a site score for the first merchant system 106 or the second merchant system 107. For example, the authentication system 110 may maintain site score data associated with a site score for the first merchant system 106 or the second merchant system 107. In such an example, the authentication system 110 may determine that the device score data associated with the device score should be updated based on the user device 102 initiating a transaction with the first merchant system 106 or the second merchant system 107. Authentication system 110 may then update the device score data associated with the device score based on the site score data associated with the site score.

In some non-limiting embodiments, an issuer system 114 may transmit data associated with the one or more factors to cause the authentication system 110 to update the device score based on processing and/or determining the authorization request message. For example, in some non-limiting embodiments, the issuer system 114 may determine score adjustment data based on processing the authorization request message and generate an authorization response message including data associated with the one or more factors. In some non-limiting embodiments, the device score data associated with the device score may be updated outside of the context of a transaction. For example, the device score may be updated based on a determination (e.g., by the authentication system 110) that the user device 102 is reported stolen, that the issuer system 114 declares a transaction bad after the transaction is processed (e.g., when a chargeback occurs), that one or more risk models are executed in batch by the authentication system 110 to determine the activity of the account associated with the user device 102 is or is not authentic, and/or the like.

In some non-limiting embodiments, an algorithm developed in accordance with a set of logical rules may be executed to update the device score data associated with the device score to identify possible fraudulent transactions. For example, authentication system 110 may compare the logical rules to the one or more parameters (e.g., a transaction time, a transaction date, a transaction location, a transaction value, and/or the like) of one or more transactions associated with the user device 102. Additionally or alternatively, authentication system 110 may execute a machine learning algorithm and provide, as input to the machine learning algorithm, device score data and transaction data associated with transactions involving the user device 102 to cause the machine learning algorithm to predict a device score that is updated based on the transaction data for the user device 102. In some non-limiting embodiments, a device score may not be updated when disposition of a transaction was not based on activity associated with the transaction (e.g., when the transaction is declined because of a timeout or inability of the payment gateway and/or the transaction processing system 112 to transmit and/or receive data from the issuer system 114 during a transaction, and/or the like).

Figure 6A:
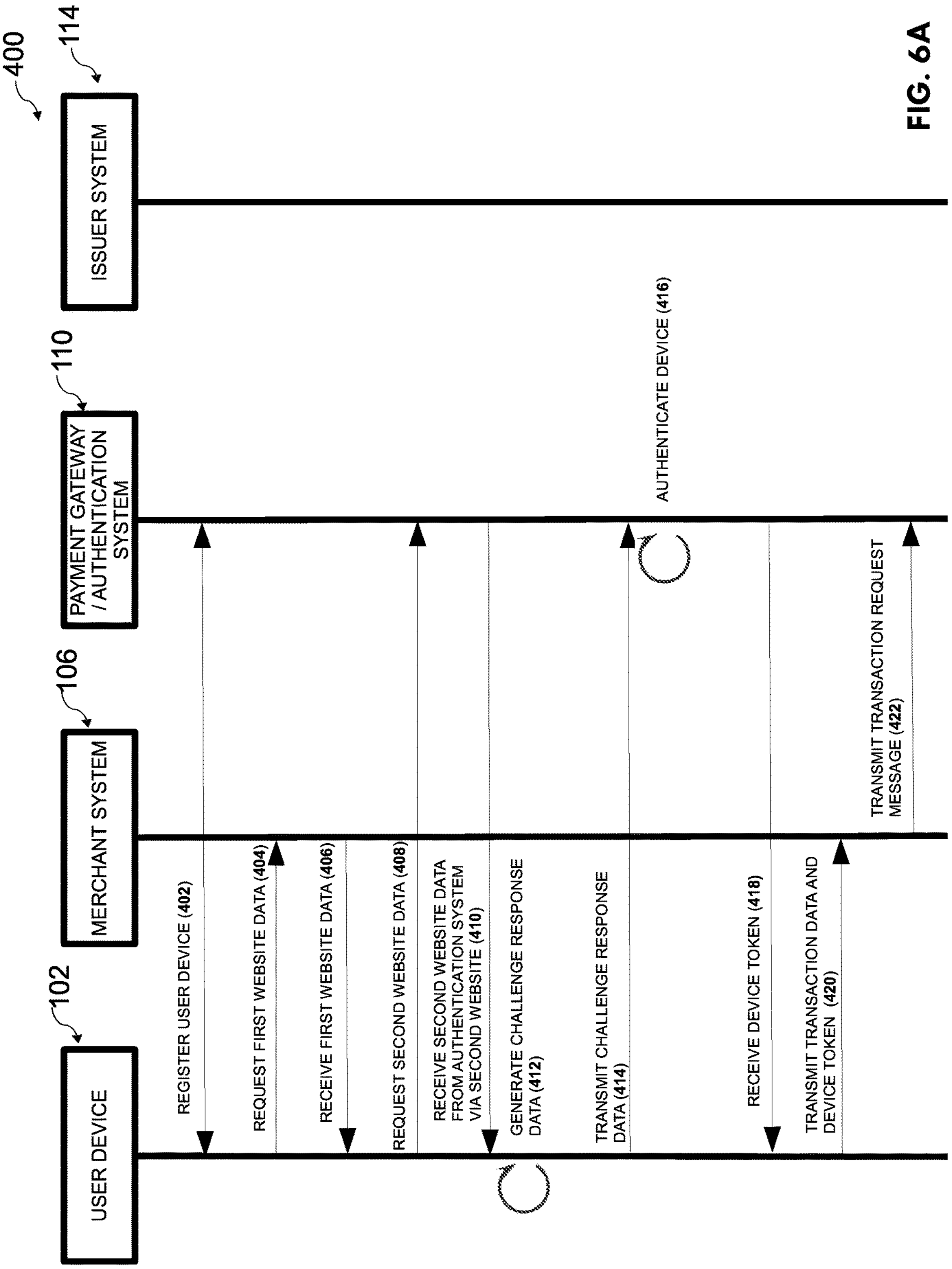
FIGS. 6A and 6B are a sequence diagrams of processes for authenticating devices according to non-limiting aspects or embodiments.
Figure 6B:
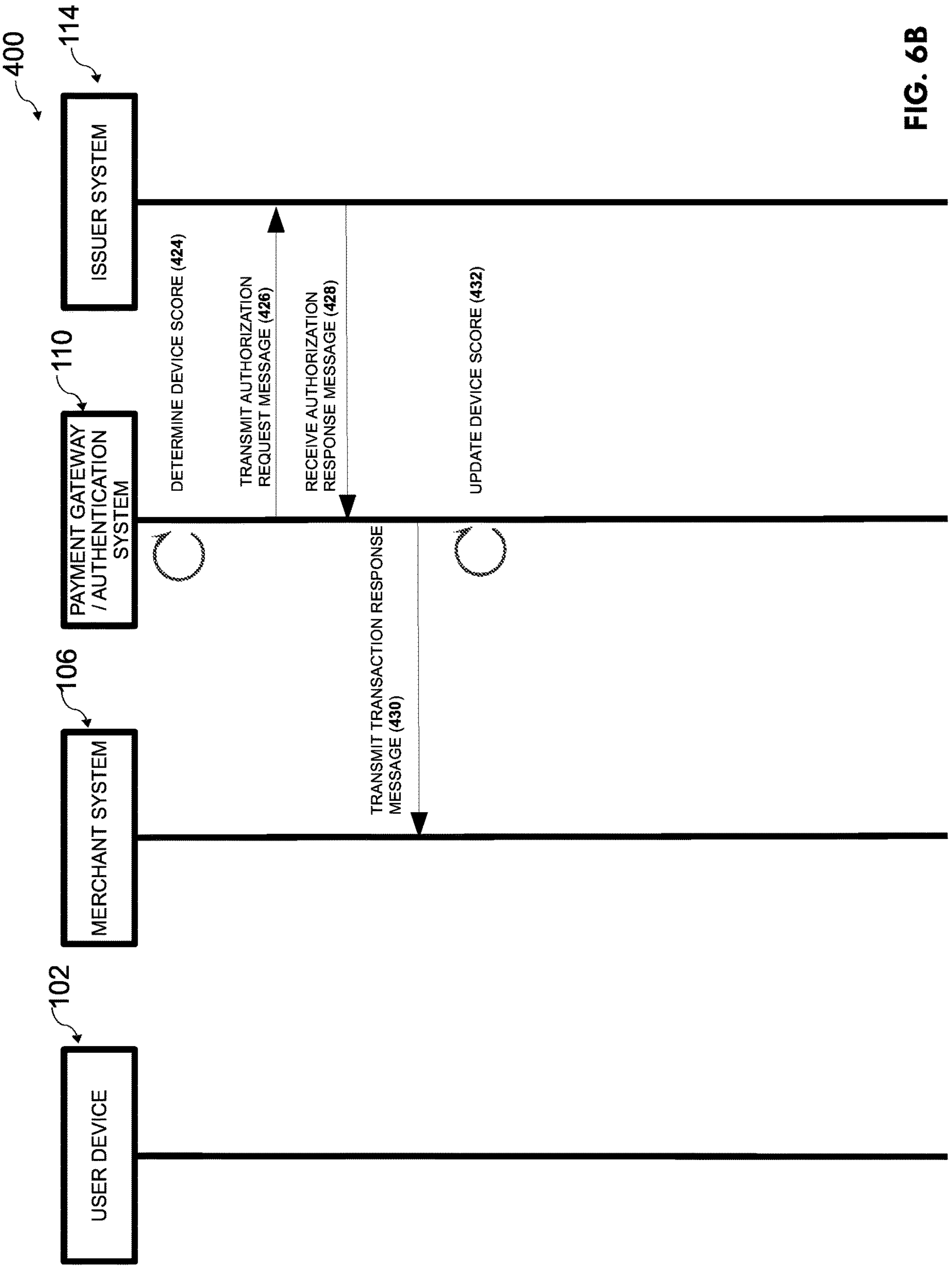

Referring now to FIGS. 6A and 6B, illustrated is an implementation 400 of a non-limiting aspect or embodiment of a process for authenticating devices according to some non-limiting embodiments of the present disclosure. As illustrated in FIGS. 6A and 6B, implementation 400 includes a user device 102, a first merchant system 106, a payment gateway, an authentication system 110, and an issuer system 114.

As shown by reference number 402 in FIG. 6A, a user device 102 may register with an authentication system 110 of a payment gateway. For example, in some non-limiting embodiments, the user device 102 may generate encryption data associated with a public key and/or a private key and/or the like. In such an example, the user device 102 may include the encryption data in registration data associated with registration of the user device 102. Additionally or alternatively, the user device 102 may include a unique device identifier in the registration data. The authentication system 110 may associate the registration data with an account maintained by the authentication system 110 based on receiving registration data. Additionally or alternatively, the authentication system 110 may associate the registration data with device score data associated with a device score of the user device 102.

As shown by reference number 404 in FIG. 6A, the user device 102 may request first website data associated with a first website from the first merchant system 106. For example, the user device 102 may attempt to login via a login page of a first website.

As shown by reference number 406 in FIG. 6A, the user device 102 may receive first website data from a first merchant system 106. For example, the user device 102 may receive the first website data associated with the first website transmitted by the first merchant system 106, the first website data including a uniform resource locator (URL) to a second website maintained by the authentication system 110.

As shown by reference number 408 in FIG. 6A, the user device 102 may request second website data associated with a second website. For example, the user device 102 may transmit a request for second website data associated with a second website from the authentication system 110, the second website data associated with the URL to the second website included in the first website data.

As shown by reference number 410 in FIG. 6A, the user device 102 may receive second website data from the authentication system 110. For example, the user device 102 may receive second website data from the authentication system 110 in response to requesting the second website data. The second website data may include a device authentication request message including challenge data associated with a challenge. In some non-limiting embodiments, the user device 102 may prompt the user to respond to a local authentication request before generating challenge response data associated with a challenge. In such an example, the user operating the user device may provide input to the user device 102 including identifying data associated with the user's identity.

As shown by reference number 412 in FIG. 6A, the user device 102 may generate challenge response data associated with a challenge response. For example, the user device 102 may encrypt the challenge data and/or data derived from the challenge data with a private key of the user device 102. In some non-limiting embodiments, the user device 102 may also include a unique device identifier of the user device 102 with or in the challenge data.

As shown by reference number 414 in FIG. 6A, the user device 102 may transmit the challenge response data associated with the challenge response. For example, the user device 102 may transmit the challenge response data to the authentication system 110 via the second website. In another example, the user device 102 may transmit the challenge response data to the authentication system 110 via a device authentication response message.

As shown by reference number 416 in FIG. 6A, the authentication system 110 may authenticate the user device 102. For example, the authentication system 110 may authenticate the user device 102 by decrypting the challenge response data associated with the challenge response transmitted via the device authentication response message with a public key of the user device 102. The authentication system 110 may compare the decrypted challenge response data to the challenge data and/or the registration data to determine that the user device 102 is authentic.

As shown by reference number 418 in FIG. 6A, the authentication system 110 may transmit a device authentication identifier to the user device 102. For example, the authentication system 110 may transmit the device authentication identifier based on successful authentication of the user device 102. In such an example, the device authentication identifier may be transmitted via a device authentication identifier message to the user device 102. In some non-limiting embodiments, the authentication system 110 may generate a one-time use token and transmit the one-time use token as the device authentication identifier to the merchant system 106 via a frame associated with the second website.

As shown by reference number 420 in FIG. 6A, the user device 102 may transmit transaction data associated with a transaction and the device authentication identifier to the first merchant system 106. For example, the user device 102 may transmit transaction data associated with a transaction and the device authentication identifier to the first merchant system 106 based on receiving the device authentication identifier from the authentication system 110. In such an example, the user device may transmit transaction data associated with a transaction and the device authentication identifier via a transaction request message to the first merchant system 106.

As shown by reference number 422 in FIG. 6A, the first merchant system 106 may transmit a transaction request message to the payment gateway. For example, the first merchant system 106 may generate a transaction request message based on receiving transaction data associated with the transaction and the device authentication identifier. In some non-limiting embodiments, the first merchant system 106 may forward the transaction request message received from the user device 102 to the payment gateway.

As shown by reference number 424 in FIG. 6B, the payment gateway system may determine a device score. For example, the payment gateway system may query the authentication system 110 for the device score by transmitting the device authentication identifier to the authentication system 110. The authentication system 110 may look up device score data associated with the device score in a database based on the device authentication identifier. The authentication system 110 may then transmit the device score data associated with the device score of the user device 102 to the payment gateway.

As shown by reference number 426 in FIG. 6B, the payment gateway system may transmit an authorization request message. For example, the payment gateway may generate an authorization request message based on the transaction data associated with the transaction and the device score data associated with the device score. The payment gateway may then transmit the authorization request message including the transaction data and the device score data to the issuer system 114.

As shown by reference number 428 in FIG. 6B, the payment gateway system may receive an authorization response message from the issuer system 114. For example, the issuer system 114 may determine whether the transaction is approved or not approved based on the transaction data and the device score data included in the authorization request message. The issuer system 114 may then generate an authorization response message based on determining whether the transaction is approved or not approved, and transmit the authorization response message to the payment gateway. In some non-limiting embodiments, the issuer system 114 may also include data associated with one or more factors of the transaction and/or adjustment factor data associated with an adjustment factor in the authorization response message.

As shown by reference number 430 in FIG. 6B, the payment gateway system may transmit a transaction response message to the first merchant system 106. For example, the payment gateway may generate a transaction response message indicating that the transaction is approved or declined based on the authorization response message. In some non-limiting embodiments, the first merchant system 106 may subsequently transmit data to the user device 102 indicating that the transaction is approved or declined.

As shown by reference number 432 in FIG. 6B, the authentication system 110 may update the device score data associated with the device score. For example, the payment gateway may transmit the authorization response message to the authentication system 110 to cause the authentication system 110 to update the device score data associated with the device score.

Although examples have been described in detail for the purpose of illustration based on what is currently considered to be the most practical and preferred aspects or embodiments, it is to be understood that such detail is solely for that purpose and that the principles described by the present disclosure are not limited to the disclosed aspects or embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method for authenticating devices, comprising:

generating, with a transaction processing system comprising at least one processor, a virtual authenticator comprising: (i) at least one authentication input, (ii) at least one account identifier associated with at least one payment account, and (iii) at least one device identifier of at least one client device, the virtual authenticator associated with a virtual authenticator identifier, the virtual authenticator comprising a graph data structure comprising a plurality of nodes representing the at least one authentication input, the at least one account identifier, and the at least one device identifier;

receiving, with the transaction processing system, a transaction request message associated with a transaction between a user and a merchant made using an authentication input of the at least one authentication input and a client device of the at least one client device, the transaction request message comprising a second account identifier different than the at least one account identifier of the virtual authenticator, wherein the at least one account identifier corresponds to a first payment account, and wherein the second account identifier corresponds to a second payment account different than the first payment account;

linking, with the transaction processing system, the second account identifier to the virtual authenticator in response to receiving the transaction request;

communicating, with the transaction processing system, an authorization request message to an issuer system, the authorization request message comprising the virtual authenticator identifier, wherein the issuer system generates an authorization response message based on the virtual authenticator;

receiving, with the at least one processor of the transaction processing system, the authorization response message;

updating, with the at least one processor of the transaction processing system, the virtual authenticator based on the authorization response message, resulting in an updated virtual authenticator;

receiving, with the at least one processor of the transaction processing system, a second transaction request message associated with a second transaction between the user and a second merchant, the second transaction request message comprising the second account identifier;

communicating, with the at least one processor of the transaction processing system, a second authorization request message to the issuer system, the second authorization request message comprising the updated virtual authenticator, wherein the issuer system generates a second authorization response message based on the updated virtual authenticator; and receiving, with the at least one processor of the transaction processing system, the second authorization response message.

2. The computer-implemented method of claim 1, wherein the transaction request message further comprises a merchant identifier, and wherein the virtual authenticator further comprises the merchant identifier.

3. The computer-implemented method of claim 1, further comprising:

receiving, with at least one processor of the transaction processing system, a plurality of additional transaction requests associated with a plurality of subsequent transactions between the user and the merchant, wherein at least one additional transaction request of the plurality of additional transaction requests comprises the second account identifier and a second authentication input;

updating the virtual authenticator based on the second authentication input and a corresponding authorization response message associated with the second authentication input; and linking the second account identifier to the virtual authenticator, wherein the second account identifier is associated with a second virtual authenticator identifier.

4. The computer-implemented method of claim 1, further comprising:

associating an authentication identifier with the virtual authenticator, wherein the authentication identifier uniquely identifies the virtual authenticator and is not communicated to the issuer system.

5. The computer-implemented method of claim 1, further comprising:

generating, with the issuer system comprising at least one processor, a registration code based on account data associated with the payment account;

receiving, with the issuer system, a confirmation message generated by the client device based on the registration code, the at least one device identifier, and the at least one authentication input;

communicating, with the issuer system, authentication data to the transaction processing system, the authentication data comprising the account identifier, the at least one device identifier, and the at least one authentication input;

generating, with the at least one processor of the transaction processing system, an authentication graph based on the authentication data;

receiving, with the at least one processor of the transaction processing system, the transaction request message associated with the transaction between the user and the merchant, the transaction request message comprising the second account identifier;

determining, with at least one processor, the authentication result based on the transaction request message and the authentication graph; and updating, with at least one processor, the authentication graph based on the authentication result.

6. A system for authenticating devices, the system comprising:

at least one hardware processor programmed or configured to:

generate a virtual authenticator comprising: (i) at least one authentication input, (ii) at least one account identifier associated with at least one payment account, and (iii) at least one device identifier of at least one client device, the virtual authenticator associated with a virtual authenticator identifier, the virtual authenticator comprising a graph data structure comprising a plurality of nodes representing the at least one authentication input, the at least one account identifier, and the at least one device identifier;

receive a transaction request message associated with a transaction between a user and a merchant made using an authentication input of the at least one authentication input and a client device of the at least one client device, the transaction request message comprising a second account identifier different than the at least one account identifier of the virtual authenticator, wherein the at least one account identifier corresponds to a first payment account, and wherein the second account identifier corresponds to a second payment account different than the first payment account;

link the second account identifier to the virtual authenticator in response to receiving the transaction request;

communicate an authorization request message to an issuer system, the authorization request message comprising the virtual authenticator identifier, wherein the issuer system generates an authorization response message based on the virtual authenticator;

receive the authorization response message;

update the virtual authenticator based on the authorization response message, resulting in an updated virtual authenticator;

receive a second transaction request message associated with a second transaction between the user and a second merchant, the second transaction request message comprising the second account identifier;

communicate a second authorization request message to the issuer system, the second authorization request message comprising the updated virtual authenticator, wherein the issuer system generates a second authorization response message based on the updated virtual authenticator; and receive the second authorization response message.

7. The system of claim 6, wherein the transaction request message further comprises a merchant identifier, and wherein the virtual authenticator further comprises the merchant identifier.

8. The system of claim 6, wherein the at least one hardware processor is further programmed or configured to:

receive a plurality of additional transaction requests associated with a plurality of subsequent transactions between the user and the merchant, wherein at least one additional transaction request of the plurality of additional transaction requests comprises the second account identifier and a second authentication input;

update the virtual authenticator based on the second authentication input and a corresponding authorization response message associated with the second authentication input; and link the second account identifier to the virtual authenticator, wherein the second account identifier is associated with a second virtual authenticator identifier.

9. The system of claim 6, wherein the at least one hardware processor is further programmed or configured to:

associate an authentication identifier with the virtual authenticator, wherein the authentication identifier uniquely identifies the virtual authenticator and is not communicated to the issuer system.

10. The system of claim 6, further comprising the issuer system, the issuer system configured to:

generate a registration code based on account data associated with the payment account;

receive a confirmation message generated by the client device based on the registration code, the at least one device identifier, and the at least one authentication input, communicate authentication data to a transaction processing system, the authentication data comprising the account identifier, the at least one device identifier, and the at least one authentication input, wherein the at least one hardware processor is further programmed or configured to:

generate an authentication graph based on the authentication data;

receive the transaction request message associated with the transaction between the user and the merchant, the transaction request message comprising the second account identifier;

determine the authentication result based on the transaction request message and the authentication graph; and update the authentication graph based on the authentication result.

11. A computer program product for authenticating devices, the computer program product comprising at least one non-transitory computer-readable medium comprising one or more program instructions that, when executed by at least one processor cause the at least one processor to:

generate a virtual authenticator comprising: (i) at least one authentication input, (ii) at least one account identifier associated with at least one payment account, and (iii) at least one device identifier of at least one client device, the virtual authenticator associated with a virtual authenticator identifier, the virtual authenticator comprising a graph data structure comprising a plurality of nodes representing the at least one authentication input, the at least one account identifier, and the at least one device identifier;

receive a transaction request message associated with a transaction between a user and a merchant made using an authentication input of the at least one authentication input and a client device of the at least one client device, the transaction request message comprising a second account identifier different than the at least one account identifier of the virtual authenticator, wherein the at least one account identifier corresponds to a first payment account, and wherein the second account identifier corresponds to a second payment account different than the first payment account;

link the second account identifier to the virtual authenticator in response to receiving the transaction request;

communicate an authorization request message to an issuer system, the authorization request message comprising the virtual authenticator identifier, wherein the issuer system generates an authorization response message based on the virtual authenticator;

receive the authorization response message;

update the virtual authenticator based on the authorization response message, resulting in an updated virtual authenticator;

receive a second transaction request message associated with a second transaction between the user and a second merchant, the second transaction request message comprising the second account identifier;

communicate a second authorization request message to the issuer system, the second authorization request message comprising the updated virtual authenticator, wherein the issuer system generates a second authorization response message based on the updated virtual authenticator; and receive the second authorization response message.

12. The computer program product of claim 11, wherein the transaction request message further comprises a merchant identifier, and wherein the virtual authenticator further comprises the merchant identifier.

13. The computer program product of claim 11, wherein the program instructions further cause the at least one processor to:

receive a plurality of additional transaction requests associated with a plurality of subsequent transactions between the user and the merchant, wherein at least one additional transaction request of the plurality of additional transaction requests comprises the second account identifier and a second authentication input;

update the virtual authenticator based on the second authentication input and a corresponding authorization response message associated with the second authentication input; and link the second account identifier to the virtual authenticator, wherein the second account identifier is associated with a second virtual authenticator identifier.

14. The computer program product of claim 11, wherein the program instructions further cause the at least one processor to:

associate an authentication identifier with the virtual authenticator, wherein the authentication identifier uniquely identifies the virtual authenticator and is not communicated to the issuer system.

15. The computer program product of claim 11, wherein the program instructions further cause the issuer system in communication with the at least one processor to:

generate a registration code based on account data associated with the payment account;

receive a confirmation message generated by the client device based on the registration code, the at least one device identifier, and the at least one authentication input;

communicate authentication data to a transaction processing system, the authentication data comprising the account identifier, the at least one device identifier, and the at least one authentication input, wherein the program instructions further cause the at least one processor to:

generate an authentication graph based on the authentication data;

receive the transaction request message associated with the transaction between the user and the merchant, the transaction request message comprising the second account identifier;

determine the authentication result based on the transaction request message and the authentication graph; and update the authentication graph based on the authentication result.

* * * * *